US012372889B2

(12) United States Patent
Choda et al.

(10) Patent No.: US 12,372,889 B2
(45) Date of Patent: Jul. 29, 2025

(54) ELECTROPHOTOGRAPHIC PHOTORECEPTOR, ELECTROPHOTOGRAPHIC PHOTORECEPTOR CARTRIDGE, AND IMAGE FORMING APPARATUS

(71) Applicant: Mitsubishi Chemical Corporation, Tokyo (JP)

(72) Inventors: Takahiro Choda, Tokyo (JP); Daisuke Yamazaki, Tokyo (JP); Akira Ando, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 18/534,360

(22) Filed: Dec. 8, 2023

(65) Prior Publication Data

US 2024/0134296 A1 Apr. 25, 2024

Related U.S. Application Data

(63) Continuation of application No. PCT/JP2022/023404, filed on Jun. 10, 2022.

(30) Foreign Application Priority Data

Jun. 10, 2021 (JP) ................................ 2021-097098

(51) Int. Cl.
*G03G 5/147* (2006.01)
*G03G 5/047* (2006.01)

(52) U.S. Cl.
CPC ......... *G03G 5/14734* (2013.01); *G03G 5/047* (2013.01); *G03G 5/14704* (2013.01)

(58) Field of Classification Search
CPC ............... G03G 5/14734; G03G 5/047; G03G 5/14704; G03G 2215/00957; G03G 15/751; G03G 15/75
See application file for complete search history.

(56) References Cited

U.S. PATENT DOCUMENTS

| | | | |
|---|---|---|---|
| 8,889,325 B2 | 11/2014 | Konishi et al. |
| 9,417,538 B2 | 8/2016 | Bellino et al. |
| 11,237,495 B2 | 2/2022 | Matsusaki et al. |
| 2013/0316277 A1 | 11/2013 | Konishi et al. |
| 2018/0224760 A1 | 8/2018 | Suzuki et al. |

(Continued)

FOREIGN PATENT DOCUMENTS

| | | |
|---|---|---|
| JP | H08-314174 A | 11/1996 |
| JP | 2002-351114 A | 12/2002 |

(Continued)

OTHER PUBLICATIONS

International Search Report issued in related International Patent Application No. PCT/JP2022/023404 dated Jul. 26, 2022.

*Primary Examiner* — Sandra Brase
(74) *Attorney, Agent, or Firm* — Morgan, Lewis & Bockius LLP

(57) ABSTRACT

The present disclosure relates to an electrophotographic photoreceptor including at least a photosensitive layer and a protective layer in sequence on a conductive support, and the protective layer contains a cured product of a curable compound, conductive particles having a band gap of 2.0 eV or more and 3.6 eV or less, and particles having a band gap of 8.0 eV or more.

19 Claims, 1 Drawing Sheet

(56) References Cited

U.S. PATENT DOCUMENTS

| | | | | |
|---|---|---|---|---|
| 2018/0356743 | A1* | 12/2018 | Shimizu | G03G 15/75 |
| 2020/0124997 | A1 | 4/2020 | Matsusaki et al. | |
| 2020/0133145 | A1* | 4/2020 | Tanabe | G03G 5/047 |
| 2020/0174385 | A1* | 6/2020 | Sakakibara | G03G 5/047 |

FOREIGN PATENT DOCUMENTS

| | | | |
|---|---|---|---|
| JP | 2003-140373 | A | 5/2003 |
| JP | 2009-139533 | A | 6/2009 |
| JP | 2013-142734 | A | 7/2013 |
| JP | 2014-002364 | A | 1/2014 |
| JP | 2016-065888 | A | 4/2016 |
| JP | 2020-067502 | A | 4/2020 |
| WO | 2010/035683 | A1 | 4/2010 |
| WO | 2017/109926 | A1 | 6/2017 |

* cited by examiner

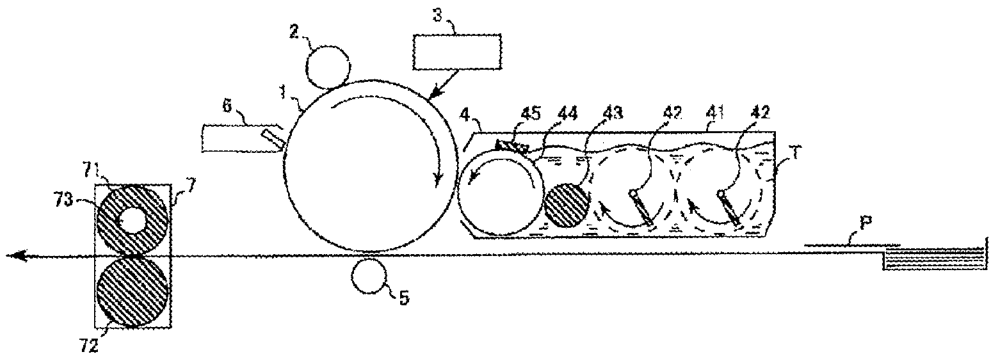
1
2
3
4
5
6
7
41
42
42
43
44
45
71
72
73
T
P

ELECTROPHOTOGRAPHIC PHOTORECEPTOR, ELECTROPHOTOGRAPHIC PHOTORECEPTOR CARTRIDGE, AND IMAGE FORMING APPARATUS

TECHNICAL FIELD

The present disclosure relates to an electrophotographic photoreceptor, an electrophotographic photoreceptor cartridge, and an image forming apparatus which are to be used for a copying machine, a printer, and the like.

BACKGROUND ART

For the reason that a high-quality image can be obtained at a high speed and other reasons, electrophotographic techniques are widely used in the field of copying machine, printer, multi-function machine, and digital printing. Regarding electrophotographic photoreceptor (hereinafter also simply referred to as "photoreceptor") which is central to the electrophotographic techniques, photoreceptors produced by using an organic photoconductive material which has advantages, such as a non-polluting property, easy film formation, and easy production, are mainly used.

An electrophotographic photoreceptor is to be repeatedly used in an electrophotographic process, that is, a cycle of electrification, exposure, development, transfer, cleaning, static elimination, and the like, and hence, is degraded under various stress during the process. In particular, since abrasion of a photosensitive layer surface due to, for example, slide rubbing with a cleaning blade, a magnetic brush, or the like or due to contact with a developer or paper and damage due to mechanical degradation, such as flaw generation or film separation, are likely to appear on an image to directly impair the image quality, such abrasion and damage are a considerable factor that reduces the life of a photoreceptor.

As a technique that improves mechanical strength or abrasion resistance of a photoreceptor surface, a photoreceptor in which a protective layer is formed by forming, as the outermost layer of the photoreceptor, a layer that contains a compound having a chain-polymerizable functional group as a binder resin and applying an energy, such as heat, light, or radiation, thereto to cause polymerization is disclosed (see, for example, PTLs 1-3).

CITATION LIST

Patent Literature

PTL 1: U.S. Pat. No. 9,417,538 B
PTL 2: JP 2003-140373 A
PTL 3: WO 2010/035683

SUMMARY

Technical Problem

When a protective layer was formed by using a polyfunctional acrylate or a polyfunctional methacrylate as a curable resin of the protective layer for improving the mechanical strength or abrasion resistance of the photoreceptor surface and by further incorporating particles of a metal oxide, such as titanium oxide, for enhancing electrical properties of the protective layer, a tendency of occurrence of image deletion at an initial stage of start of printing was seen.

Image deletion is a phenomenon that the contrast of an exposure part and a non-exposure part that form an image decreases due to transfer of electric charges from the non-exposure part to the exposure part, to thereby blur the image.

The present disclosure has been made in view of the above problem. Specifically, the present embodiment has an object to suppress occurrence of image deletion at an initial stage of start of printing in an electrophotographic photoreceptor including at least a photosensitive layer and a protective layer on a conductive support.

Solution to Problem

As a result of extensive and intensive studies for an electrophotographic photoreceptor that can satisfy the above object, the present inventors have found that the above problem can be solved by incorporating, into a curable resin in a protective layer, conductive particles having a band gap of 2.0 eV or more and 3.6 eV or less and particles having a band gap of 8.0 eV or more in combination, thus achieving the present embodiment.

The gist of the present embodiment is present in the following [1] to [17].

[1] An electrophotographic photoreceptor including at least a photosensitive layer and a protective layer in sequence on a conductive support,

- the protective layer containing a cured product of a curable compound and at least two or more kinds of particles,
- at least one kind of the two or more kinds of particles being conductive particles having a band gap of 2.0 eV or more and 3.6 eV or less, at least one other kind thereof being particles having a band gap of 8.0 eV or more.

[2] The electrophotographic photoreceptor according to the [1], wherein the curable compound is a polyfunctional acrylate or a polyfunctional methacrylate.

[3] The electrophotographic photoreceptor according to the [1] or [2], wherein the conductive particles are metal oxide particles.

[4] The electrophotographic photoreceptor according to any one of the [1] to [3], wherein the conductive particles are titanium oxide particles.

[5] The electrophotographic photoreceptor according to any one of the [1] to [4], wherein the particles having a band gap of 8.0 eV or more have a specific gravity of 3.0 $g/cm^3$ or less.

[6] The electrophotographic photoreceptor according to any one of the [1] to [5], wherein the particles having a band gap of 8.0 eV or more are silica particles.

[7] The electrophotographic photoreceptor according to any one of the [1] to [6], wherein the particles having a band gap of 8.0 eV or more contained in the protective layer are contained in a proportion of 5 parts by mass or more and 100 parts by mass or less relative to 100 parts by mass of the conductive particles contained in the protective layer.

[8] The electrophotographic photoreceptor according to any one of the [1] to [7], wherein the particles having a band gap of 8.0 eV or more are surface-treated with an organic metal compound.

[9] The electrophotographic photoreceptor according to the [8], wherein the organic metal compound is a phenyl group-containing silane coupling agent.

[10] The electrophotographic photoreceptor according to any one of the [1] to [9], wherein an average primary particle size of the particles having a band gap of 8.0 eV or more is ⅕ or more and 1/1 or less of an average primary particle size of the conductive particles.

[11] The electrophotographic photoreceptor according to any one of the [1] to [10], wherein the average primary particle size of the particles having a band gap of 8.0 eV or more is 5 nm or more and 50 nm or less.

[12] The electrophotographic photoreceptor according to any one of the [1] to [11], wherein the particles having a band gap of 8.0 eV or more are contained in the protective layer in an amount of 20 parts by mass or more and 120 parts by mass or less relative to 100 parts by mass of the curable compound contained in the protective layer.

[13] The electrophotographic photoreceptor according to any one of the [1] to [12], wherein a charge transporting material is contained in the protective layer in an amount of 1 part by mass or less relative to 100 parts by mass of the curable compound.

[14] The electrophotographic photoreceptor according to any one of the [1] to [13], wherein the photosensitive layer is of a monolayer type and contains at least a charge generating material, an electron transporting material, and a hole transporting material, and a binder resin.

[15] The electrophotographic photoreceptor according to the [14], wherein the photosensitive layer contains the hole transporting material in an amount of 70 parts by mass or more relative to 100 parts by mass of the binder resin.

[16] An electrophotographic photoreceptor cartridge including the electrophotographic photoreceptor according to any one of the [1] to [15].

[17] An image forming apparatus including the electrophotographic photoreceptor according to any one of the [1] to [15].

Advantageous Effects

According to the present embodiment, by forming a protective layer by using conductive particles having a band gap of 2.0 eV or more and 3.6 eV or less and particles having a band gap of 8.0 eV or more, it is possible to suppress flow of charges in the surface direction (also referred to as horizontal direction) of the protective layer surface to thus suppress occurrence of image deletion at an initial stage of start of printing.

BRIEF DESCRIPTION OF DRAWINGS

FIG. 1 schematically shows a configuration example of an image forming apparatus that can be configured with an electrophotographic photoreceptor according to an example of the present embodiment.

DESCRIPTION OF EMBODIMENTS

An aspect for implementing the present embodiment (hereinafter referred to as an embodiment of the present disclosure) will be described in detail below. Note that the present disclosure is not to be limited to the following embodiment, and can be implemented with various modification within the scope of the gist of the disclosure.

<<This Electrophotographic Photoreceptor>>

An electrophotographic photoreceptor according to an example of the embodiment of the present disclosure (also referred to as "this electrophotographic photoreceptor" or "this photoreceptor") is an electrophotographic photoreceptor provided with at least a photosensitive layer and a protective layer in sequence on a conductive support.

This electrophotographic photoreceptor can optionally include a layer other than the photosensitive layer and the protective layer.

In addition, the electrifying system of this electrophotographic photoreceptor may be any of a negative electrifying system in which a photoreceptor surface is electrified with negative charges or a positive electrifying system in which a photoreceptor surface is electrified with positive charges.

In this electrophotographic photoreceptor, the side opposite to the conductive support is an upper side or a front surface side and the side of the conductive support is a lower side or a rear surface side.

<This Protective Layer>

The protective layer of this electrophotographic photoreceptor (also referred to as "this protective layer") contains at least a cured product of a curable compound, that is, a cured product obtained by curing a curable compound and at least two or more kinds of particles.

(Curable Compound)

Examples of the curable compound can include a monomer, an oligomer, and a polymer which have a radical polymerizable functional group. Among them, a curable compound having a cross-linking property, in particular, a photocurable compound is preferred. For example, a curable compound having two or more radical polymerizable functional groups can be exemplified. A compound having one radical polymerizable functional group can be used together.

As the radical polymerizable functional group, a case where any one of an acryloyl group (which encompasses an acryloyloxy group) and a methacryloyl group (which encompassed a methacryloyloxy group) is contained or a case where both of an acryloyl group and a methacryloyl group are contained may be exemplified.

Among the curable compounds, from the viewpoint of curability, a polyfunctional acrylate or a polyfunctional methacrylate is preferred.

Among them, from the viewpoint of high resistance to acidic gas and the like and capability of suppressing occurrence of image deletion after repeated printing processes, a polyfunctional methacrylate is particularly preferred.

It was found from a study of the present inventors that a polyfunctional methacrylate has a higher resistance to acidic gas and the like as compared with a polyfunctional acrylate. Thus, when a polyfunctional acrylate is used as the curable resin in the protective layer, the protective layer is likely to degrade due to acidic gas and the like emitted from an electrification apparatus and the like to cause image deletion during repeated printing processes, whereas when a polyfunctional methacrylate is used, occurrence of image deletion can be suppressed even after repeated printing processes.

Examples of the polyfunctional acrylate can include urethane acrylate, an alkyl acrylate, a hydroxy group-containing alkyl acrylate, polyethylene glycol acrylate, polypropylene glycol acrylate, polytetramethylene glycol acrylate, dioxane acrylate, tricyclodecanol acrylate, fluorene acrylate, an alkoxylated bisphenol A acrylate, (alkoxylated) trimethylolpropane acrylate, (alkoxylated) glycerol acrylate, (caprolactone-modified) isocyanurate acrylate, (alkoxylated) pentaerythritol acrylate, (alkoxylated) ditrimethylolpropane acrylate, (alkoxylated) dipentaerythritol acrylate, polypentaerythritol polyacrylate, and dendritic polymer acrylate. Among them, urethane acrylate, (alkoxylated) trimethylolpropane acrylate, (alkoxylated) pentaerythritol acrylate, and (alkoxylated) dipentaerythritol acrylate are preferred, and urethane acrylate and (alkoxylated) pentaerythritol acrylate are more preferred.

Examples of the polyfunctional methacrylate can include urethane methacrylate, an alkyl methacrylate, a hydroxy group-containing methacrylate, polyethylene glycol methacrylate, polypropylene glycol methacrylate, tricyclodecanol methacrylate, ethoxylated bisphenol A methacrylate, (alkoxylated) trimethylolpropane methacrylate, ethoxylated glycerol methacrylate, (alkoxylated) pentaerythritol methacrylate, (alkoxylated) ditrimethylolpropane methacrylate, and (alkoxylated) dipentaerythritol methacrylate. Among them, urethane methacrylate, trimethylolpropane methacrylate, (alkoxylated) pentaerythritol methacrylate, and (alkoxylated) dipentaerythritol methacrylate are preferred, and urethane methacrylate and trimethylolpropane methacrylate are more preferred.

The number of the functional groups of the polyfunctional methacrylate is, from the viewpoint of degree of cure, preferably two or more, and from the viewpoint of the rate of elastic deformation, more preferably three or more. Meanwhile, the number of the functional groups is preferably six or less, and from the viewpoint of the degree of cure, more preferably five or less, and from the viewpoint of the degree of cure, more preferably four or less.

(At Least Two or More Kinds of Particles)

At least one kind of the at least two or more kinds of particles contained in this protective layer is conductive particles having a band gap of 2.0 eV or more and 3.6 eV or less, and at least one other kind thereof is particles having a band gap of 8.0 eV or more.

(Conductive Particles)

By incorporating conductive particles having a band gap of 2.0 eV or more and 3.6 eV or less in this protective layer, the charge transporting property in the protective layer, that is, the charge transporting property from the interface between the protective layer and the photosensitive layer to the protective layer surface (the charge transporting property in the vertical direction) can be enhanced and the electrical properties of this photoreceptor can be enhanced.

Examples of the conductive particles having a band gap of 2.0 eV or more and 3.6 eV or less can include particles of a metal oxide containing one metal element, such as titanium oxide, indium oxide, zinc oxide, or iron oxide, particles of a metal oxide, such as indium tin oxide, calcium titanate, strontium titanate, or barium titanate, metal particles, and carbon black. The conductive particles may be one kind of particles or may be a combination of two or more kinds of particles.

Among these conductive particles, metal oxide particles are preferred, and among these metal oxide particles, from the viewpoint of the electron transporting property, titanium oxide, indium tin oxide, and zinc oxide are preferred, and titanium oxide and zinc oxide are more preferred. Among them, from the viewpoint of easily achieving a good balance between image deletion suppression and electrical properties, titanium oxide is particularly preferred.

The band gap can be determined from a diffusion reflection spectrum obtained by diffusion reflection measurement with an ultraviolet and visible spectrophotometer.

As the crystal form of the titanium oxide particles, any of rutile, anatase, brookite, and amorphous can be used. In addition, two or more different crystal forms selected from the crystal forms may be contained.

The conductive particles may be surface-treated with an organic metal compound.

Examples of the organic metal compound can include an organic silicon compound, an organic titanium compound, an organic zirconium compound, and an organic aluminum compound. Among them, an organic silicon compound is preferred.

Examples of the organic silicon compound can include silicone oils, such as dimethylpolysiloxane, a dimethylpolysiloxane having a reactive group at a terminal, and methyl hydrogen polysiloxane, organosilanes, such as methyldimethoxysilane and diphenyldimethoxysilane, a silazane, such as hexamethyldisilazane, silane agents, such as coupling 3-methacryloyloxypropyltrimethoxysilane, 3-acryloyloxypropyltrimethoxysilane, vinyltrimethoxysilane, γ-mercaptopropyltrimethoxysilane, and γ-aminopropyltriethoxysilane, and a phenyl group-containing silane coupling agent.

In particular, from the viewpoint of easily imparting hydrophobicity, methyl hydrogen polysiloxane, methyldimethoxysilane, hexamethyldisilazane, and a dimethylpolysiloxane having a reactive group at a terminal are preferred, methyl hydrogen polysiloxane and methyldimethoxysilane are more preferred, and methyldimethoxysilane is further preferred.

The conductive particles may be surface-treated with an inorganic insulating compound.

It is considered that, by surface-treating the conductive particles with an inorganic insulating compound, the charge conductivity of the conductive particles is decreased, and thus, a decrease in the surface resistivity of the protective layer can be suppressed and flow of charges in the surface direction (also referred to as horizontal direction) of the protective layer surface can be suppressed so that image deletion can be more effectively suppressed. Metal oxide particles surface-treated with an inorganic insulating compound has a lower charge conductivity as compared with particles that are not surface-treated, but has a certain degree of charge conductivity.

The inorganic insulating compound may be any inorganic insulating compound that has a larger band gap than the conductive particles. Specifically, the band gap is preferably 2.0 eV or more larger, more preferably 3.0 eV or more larger than that of the conductive particles.

As the inorganic insulating compound, an inorganic insulating compound having a band gap of 5.0 eV or more is preferably used. Examples of the inorganic insulating compound having a band gap of 5.0 eV or more can include aluminum oxide, silicon oxide, and zirconium oxide, and hydroxides thereof. Among them, from the viewpoint of easy surface treatment, aluminum hydroxide and silicon oxide are preferred, and aluminum hydroxide is more preferred.

The conductive particles may be surface-treated with both of an organic metal compound and an inorganic insulating compound. In this case, it is preferred that the conductive particles are first surface-treated with an inorganic insulating compound and then, further surface-treated with an organic metal compound.

In addition, the conductive particles surface-treated with an organic metal compound and the conductive particles surface-treated with an inorganic insulating compound may be used in combination.

The content of the conductive particles in this protective layer is, from the viewpoint of suppressing image deletion, relative to 100 parts by mass of the curable compound contained in this protective layer, preferably 5 parts by mass or more, above all, more preferably 10 parts by mass or more, and above all, further preferably 20 parts by mass or more. In addition, from the viewpoint of keeping the surface resistance well, the content is preferably 300 parts by mass or less, above all, more preferably 200 parts by mass or less, above all, more preferably 150 parts by mass or less, and above all, further preferably 120 parts by mass or less.

(Particles Having Band Gap of 8.0 eV or More)

As described above, when a protective layer is formed by using a polyfunctional acrylate or a polyfunctional methacrylate as a curable resin of the protective layer and further incorporating conductive particles of titanium oxide or the like for enhancing electrical properties of the protective layer, a tendency of occurrence of image deletion at an initial stage of start of printing is seen.

The reason is presumably that, when a polyfunctional acrylate or a polyfunctional methacrylate is used as a curable resin of the protective layer, dispersibility of the conductive particles in the protective layer is likely to decrease and the conductive particles are concentrated and aggregated on the protective layer surface to reduce the surface resistivity of the protective layer surface, whereby charges easily transfer in the surface direction (also referred to as horizontal direction) of the protective layer surface.

As a result of a study of the present inventors, it was found that image deletion at an initial stage of start of printing can be suppressed by incorporating, into this protective layer, particles having a band gap of 8.0 eV or more together with the conductive particles, that is, the conductive particles having a band gap of 2.0 eV or more and 3.6 eV or less. The reason is presumed as follows.

Particles having a band gap of 8.0 eV or more has a lower charge conductivity than the conductive particles. By using the particles having a lower charge conductivity together with the conductive particles, reduction in the surface resistivity of the protective layer is suppressed, and thus, flow of charges in the surface direction (also referred to as horizontal direction) of the protective layer surface can be suppressed so that image deletion can be effectively suppressed.

The band gap of the particles is, from the viewpoint of the low charge conductivity, more preferably 8.5 eV or more, and further preferably 9.0 eV or more. Meanwhile, the band gap of the particles is preferably 12.0 eV or less, and more preferably 10.0 eV or less.

Examples of the particles having a band gap of 8.0 eV or more include silica particles and alumina particles. Among them, silica particles are preferred.

The particles having a band gap of 8.0 eV or more preferably have a specific gravity of 3.0 $g/cm^3$ or less, more preferably 2.5 $g/cm^3$ or less, and further preferably 2.2 $g/cm^3$ or less.

It is considered that, when the specific gravity is 3.0 $g/cm^3$ or less, the particles having a band gap of 8.0 eV or more are more easily concentrated in the protective layer surface than the conductive particles. It is considered that, when particles having a low charge conductivity are concentrated in the protective layer surface, reduction in the surface resistivity of the protective layer is suppressed more, and thus, flow of charges in the surface direction (also referred to as horizontal direction) of the protective layer surface can be suppressed more so that image deletion can be more effectively suppressed. It is further considered that the particles having a band gap of 8.0 eV or more intervene among the conductive particles in the form of spacer here, which can also suppress charge transfer in the horizontal direction to thus be able to suppress image deletion.

The particles having a band gap of 8.0 eV or more may also be surface-treated with an organic metal compound.

Since the surface can be further hydrophobized when the particles having a band gap of 8.0 eV or more are further surface-treated with an organic metal compound, image deletion can be furthermore effectively suppressed.

As the organic metal compound, the same organic metal compounds as described for the conductive particles can be exemplified, and among them, methyl hydrogen polysiloxane, methyldimethoxysilane, hexamethyldisilazane, a dimethylpolysiloxane having a reactive group at a terminal, and a phenyl group-containing silane coupling agent are preferred, methyl hydrogen polysiloxane, methyldimethoxysilane, and a phenyl group-containing silane coupling agent are more preferred, and a phenyl group-containing silane coupling agent is further preferred.

The average primary particle size of the particles having a band gap of 8.0 eV or more is, from the viewpoint of easy intervention of the particles having a band gap of 8.0 eV or more among the conductive particles in the form of spacer, preferably 1/1 or less of the average primary particle size of the conductive particles, above all, more preferably ⅔ or less, and above all, further preferably ½ or less. Meanwhile, from the viewpoint of keeping the intervals among the conductive particles having a band gap of 2.0 eV or more 3.6 eV or less, the average primary particle size is preferably ⅕ or more of the average primary particle size of the conductive particles, above all, more preferably ¼ or more, and above all, further preferably ⅓ or more.

As the particle size of the particles having a band gap of 8.0 eV or more, from the viewpoint of stability of an application liquid, the average primary particle size is preferably 500 nm or less, above all, more preferably 1 nm or more or 100 nm or less, and above all, further preferably 5 nm or more or 50 nm or less.

The average primary particle size can be determined as the arithmetic mean value of the sizes of particles directly observed with a scanning electron microscope (hereinafter also referred to as SEM) or a transmission electron microscope (hereinafter also referred to as TEM). Here, the arithmetic mean value is preferably an average of the particle sizes of at least 5 or more particles. When a particle has a non-spherical shape, the longest diameter and the shortest diameter are measured and the average thereof is taken as the particle size of the particle.

The content of the particles having a band gap of 8.0 eV or more in this protective layer is, from the viewpoint of suppressing image deletion, relative to 100 parts by mass of the curable compound contained in this protective layer, preferably 5 parts by mass or more, above all, more preferably 10 parts by mass or more, and above all, further preferably 20 parts by mass or more. In addition, from the viewpoint of keeping the surface resistance well, the content is preferably 300 parts by mass or less, above all, more preferably 200 parts by mass or less, and above all, further preferably 120 parts by mass or less.

The content of the particles having a band gap of 8.0 eV or more contained in the protective layer is, from the viewpoint of suppressing image deletion, relative to 100 parts by mass of the conductive particles contained in the protective layer, preferably 5 parts by mass or more, above all, more preferably 10 parts by mass or more, and above all, further preferably 20 parts by mass or more. Meanwhile, from the viewpoint of keeping the surface resistance well, the content is, relative to 100 parts by mass of the conductive particles contained in the protective layer, preferably 100 parts by mass or less, more preferably 50 parts by mass or less, above all, more preferably 40 parts by mass or less, and above all, further preferably 30 parts by mass or less.

(Other Materials)

This protective layer may contain, besides the above materials, other materials as needed. As the other materials, for example, from the viewpoint of enhancing the charge transporting capability, a "charge transporting material" may be contained, or, for promoting polymerization reaction, a "polymerization initiator" may be contained. Furthermore, as needed, for example, a stabilizer (thermal stabilizer, ultraviolet absorber, photostabilizer, antioxidant, etc.), a dispersant, an antistatic agent, a colorant, and a lubricant can be exemplified. One of these materials can be appropriately used alone, or two or more thereof can be used at any ratio and in any combination.

[Charge Transporting Material]

As the charge transporting material contained in this protective layer, the same charge transporting materials as those used in this photosensitive layer described later can be used.

In addition, from the viewpoint of enhancing the Martens hardness of the photoreceptor surface, the protective layer may contain a structure obtained by polymerizing a charge transporting material having a chain-polymerizable functional group.

Examples of the chain-polymerizable functional group of the charge transporting material having a chain-polymerizable functional group can include an acryloyl group, a methacryloyl group, a vinyl group, and an epoxy group. Among them, from the viewpoint of curability, an acryloyl group or a methacryloyl group is preferred. As the structure of the charge transporting material moiety of the charge transporting material having a chain-polymerizable functional group, a carbazole derivative, an arylamine derivative, a stilbene derivative, a butadiene derivative, and an enamine derivative, and a structure obtained by bonding two or more of the above compounds are preferred.

The amount of the charge transporting material used in the protective layer of this electrophotographic photoreceptor is not particularly limited. From the viewpoint of electrical properties, the amount is preferably 1 part by mass or less relative to 100 parts by mass of the curable compound, above all, more preferably 0.5 parts by mass or less, and above all, further preferably 0.1 parts by mass or less.

[Polymerization Initiator]

Examples of the polymerization initiator contained in this protective layer can include a thermal polymerization initiator and a photopolymerization initiator.

Examples of the thermal polymerization initiator can include a peroxide compound, such as 2,5-dimethylhexane-2,5-dihydroperoxide, and an azo compound, such as 2,2'-azobis(isobutyronitrile).

Photopolymerization initiator can be classified into a direct cleavage type and a hydrogen withdrawing type by difference in the radical generation mechanism.

Examples of the direct cleavage-type photopolymerization initiator can include acetophenone-based or ketal-based compounds, such as acetophenone, 2-benzoyl-2-propanol, 1-benzoylcyclohexanol, 2,2-diethoxyacetophenone, benzyl dimethyl ketal, and 2-methyl-4'-(methylthio)-2-morpholinopropiophenone, benzoin ether-based compounds, such as benzoin, benzoin methyl ether, benzoin ethyl ether, benzoin isobutyl ether, benzoin isopropyl ether, and O-tosylbenzoin, and acylphosphine oxide-based compounds, such as diphenyl(2,4,6-trimethylbenzoyl) phosphine oxide, phenylbis(2,4,6-trimethylbenzoyl) phosphine oxide, and lithium phenyl (2,4,6-trimethylbenzoyl) phosphonate.

Examples of the hydrogen withdrawing-type photopolymerization initiator can include benzophenone-based compounds, such as benzophenone, 4-benzoylbenzoic acid, 2-benzoylbenzoic acid, methyl 2-benzoylbenzoate, methyl benzoylformate, benzyl, p-anisil, 2-benzoylnaphthalene, 4,4'-bis(dimethylamino)benzophenone, 4,4'-dichlorobenzophenone, and 1,4-dibenzoylbenzene, and anthraquinone-based or thioxanthone-based compounds, such as 2-ethylanthraquinone, 2-isopropylthioxanthone, 2-chlorothioxanthone, 2,4-dimethylthioxanthone, 2,4-diethylthioxanthone, and 2,4-dichlorothioxanthone. Examples of other photopolymerization initiators can include camphor quinone, 1-phenyl-1,2-propanedione-2-(o-ethoxycarbonyl) oxime, an acridine-based compound, a triazine-based compound, and an imidazole-based compound.

The photopolymerization initiator preferably has an absorption wavelength within the wavelength range of the light source used for photoirradiation in order to efficiently absorb light energy to generate radicals.

From the viewpoint of preventing reduction in the generation efficiency of radicals, among the photopolymerization initiators, an acylphosphine oxide-based compound which has an absorption wavelength in a relatively longer wavelength region is preferably contained.

In this case, from the viewpoint of complementing the curability of the protective layer surface, a combination use of an acylphosphine oxide-based compound and a hydrogen withdrawing-type initiator is further preferred. The ratio of the hydrogen withdrawing-type initiator to the acylphosphine oxide-based compound contained is not particularly limited, but, from the viewpoint of complementing the surface curability, the hydrogen withdrawing-type initiator is preferably contained in an amount of 0.1 parts by mass or more relative to 1 part by mass of the acylphosphine oxide-based compound, and from the viewpoint of maintaining inner curability, is preferably contained in an amount of 5 parts by mass or less.

In addition, an initiator having a photopolymerization promoting effect can be used alone or in combination with the aforementioned photopolymerization initiator. Examples of the initiator having a photopolymerization promoting effect can include triethanolamine, methyldiethanolamine, ethyl 4-dimethylaminobenzoate, isoamyl 4-dimethylaminobenzoate, (2-dimethylamino) ethyl benzoate, and 4,4'-dimethylaminobenzophenone.

One of the polymerization initiators may be used or two or more thereof may be used in mixture. The content of the polymerization initiator is preferably 0.5 to 40 parts by mass relative to 100 parts by mass of the total content of initiators having a radical polymerization property, above all, further preferably 1 part by mass or more or 20 parts by mass or less.

(Method for Forming this Protective Layer)

Next, a method for forming this protective layer will be described.

The method for forming this protective layer is not particularly limited. For example, this protective layer can be formed by applying an application liquid in which a curable compound, such as a polyfunctional acrylate or a polyfunctional methacrylate, conductive particles having a band gap of 2.0 eV or more and 3.6 eV or less, particles having a band gap of 8.0 eV or more, and other materials are dissolved in a solvent or an application liquid in which the materials are dispersed in a dispersion medium.

The solvent or dispersion medium used for forming this protective layer and the application method will be described below.

[Solvent Used in Application Liquid for Forming Protective Layer]

Examples of an organic solvent used in the application liquid for forming this protective layer can include alcohols, such as methanol, ethanol, propanol, and 2-methoxyethanol; ethers, such as tetrahydrofuran, 1,4-dioxane, and dimethoxyethane; esters, such as methyl formate and ethyl acetate; ketones, such as acetone, methyl ethyl ketone, and cyclohexanone; aromatic hydrocarbons, such as benzene, toluene, xylene, and anisole; chlorinated hydrocarbons, such as dichloromethane, chloroform, 1,2-dichloroethane, 1,1,2-trichloroethane, 1,1,1-trichloroethane, tetrachloroethane, 1,2-dichloropropane, and trichloroethylene; nitrogen-containing compounds, such as n-butylamine, isopropanolamine, diethylamine, triethanolamine, ethylenediamine, and triethylenediamine; and aprotic polar solvents, such as acetonitrile, N-methylpyrrolidone, N,N-dimethylformamide, and dimethyl sulfoxide. Any combination thereof and a mixed solvent of any ratio thereof can also be used. In addition, an organic solvent that does solely not dissolve materials for the protective layer of this electrophotographic photoreceptor but can dissolve the materials, for example, as a mixed solvent with any of the aforementioned organic solvents can be used. In general, uneven application can be reduced by using a mixed solvent. When an immersion application method is used among application methods as described later, a solvent that does not dissolve the lower layer is preferably chosen. From this point of view, an alcohol having a low solubility of polycarbonate or polyarylate which is suitably used in the photosensitive layer is preferably incorporated.

The ratio of the amount of the organic solvent used in the application liquid for forming this protective layer and the amount of the solid materials differs depending on the application method of the application liquid for forming a protective layer, and may be appropriately varied and used so that a uniform coating film is formed in the application method used.

[Application Method]

The application method of the application liquid for forming this protective layer is not particularly limited, and examples thereof can include a spray application method, a spiral application method, a ring application method, and an immersion application method.

A coating film is formed by the above application method, and then the coating film is dried. Here, the temperature and time of drying may be any as long as necessary and sufficient drying can be achieved. However, when application of the protective layer is performed after only air drying after application of the photosensitive layer, sufficient drying is preferably performed by the method described in <method for forming photosensitive layer> described later.

[Method of Curing this Protective Layer]

This protective layer is formed by applying such a coating liquid and then curing the coating liquid with an energy given from the outside. Examples of the external energy used here include heat, light, and radiation.

In a method for giving thermal energy, heat is given from a coating surface side or a support side using a gas, such as air or nitrogen, steam, various heat media, infrared light, or an electromagnetic wave. The heating temperature is preferably 100° C. or higher and 170° C. or lower.

As the light energy, a UV irradiation light source, such as a high pressure mercury lamp, a metal halide lamp, an electrodeless lamp bulb, or a light emitting diode, which mainly has an emission wavelength in ultraviolet light (UV), is used. A visible light source can also be selected according to the absorption wavelength of the chain-polymerizable compound or the photopolymerization initiator.

The irradiation quantity of light is, from the viewpoint of curability, preferably 10 $J/cm^2$ or more, further preferably 30 $J/cm^2$ or more, and particularly preferably 100 $J/cm^2$ or more. In addition, from the viewpoint of electrical properties, the irradiation quantity of light is preferably 500 $J/cm^2$ or less, further preferably 300 $J/cm^2$ or less, and particularly preferably 200 $J/cm^2$ or less.

On the other hand, as the radiation energy, use of an electron beam (EB) can be exemplified.

Among the energies, from the viewpoint of easiness of controlling the reaction rate, convenience of apparatus, and length of pod life, a light energy is preferably used.

After curing the protective layer, from the viewpoint of relaxation of residual stress, relaxation of residual radical, and improvement in electrical properties, a heating step may be added. The heating temperature is preferably 60° C. or higher, more preferably 100° C. or higher, and preferably 200° C. or lower, more preferably 150° C. or lower.

(Film Thickness)

The thickness of this protective layer is, from the viewpoint of abrasion resistance, preferably 0.5 μm or more, and above all, further preferably 1 μm or more. Meanwhile, from the viewpoint of electrical properties, the thickness is preferably 5 μm or less, and above all, further preferably 3 μm or less.

In addition, from the same point of view, the thickness of this protective layer is preferably 1/50 or more of the thickness of this photosensitive layer, above all, more preferably 1/40 or more, and above all, further preferably 1/30 or more. Meanwhile, the thickness is preferably 1/5 or less, above all, more preferably 1/10 or less, and above all, further preferably 1/20 or less.

<This photosensitive Layer>

The photosensitive layer in this electrophotographic photoreceptor (also referred to as "this photosensitive layer") is simply to be a layer that contains at least a charge generating material (CGM) and a charge transporting material.

This photosensitive layer may be a monolayer-type photosensitive layer that contains at least a charge generating material (CGM), a hole transporting material (HTM), and an electron transporting material (ETM), and a binder resin in the same one layer, or may be a laminate-type photosensitive layer which has layers separated into charge generating layers and charge transporting layers.

Among them, this photosensitive layer is preferably a monolayer-type photosensitive layer in that the effect of the present embodiment is provided more. This is because, when this photosensitive layer is a monolayer-type photosensitive layer, charges easily transfer in the surface direction (also referred to as horizontal direction) of this protective layer surface under an influence of a hole transporting material present in the vicinity of the interface with this protective layer, and thus image deletion is more likely to occur.

<Monolayer-Type Photosensitive Layer>

When this photosensitive layer is a monolayer-type photosensitive layer, at least a charge generating material (CGM), a hole transporting material (HTM), and an electron transporting material (ETM), and a binder resin are contained.

(Charge Generating Material)

As the charge generating material used in this photosensitive layer, for example, various photoconductive materials, such as an inorganic photoconductive material and an organic pigment, can be used. Among them, in particular, an organic pigment is preferred, and furthermore, a phthalocyanine pigment and an azo pigment are more preferred.

In particular, when a phthalocyanine pigment is used as the charge generating material, specifically, non-metal phthalocyanine, a phthalocyanine to which a metal, such as cupper, indium, gallium, tin, titanium, zinc, vanadium, silicon, or germanium, or an oxide or halide thereof, coordinates, or the like is used. Examples of a ligand to a tri- or higher valent metal atom, other than an oxygen atom or a chlorine atom as described above, can include a hydroxy group and an alkoxy group. Among them, X-type and t-type non-metal phthalocyanine, A-type, B-type, and D-type titanyl phthalocyanine, vanadyl phthalocyanine, chloroindium phthalocyanine, chlorogallium phthalocyanine, hydroxygallium phthalocyanine, and the like which are particularly highly sensitive are suitable.

When an azo pigment is used, various known bisazo pigments and trisazo pigments are suitably used.

One of the charge generating materials may be used alone or two or more thereof may be used in any combination and at any ratio. When two or more charge generating materials are used together, as a method for mixing the charge generating materials to be used together, each charge generating material can be mixed later and then be used, or may be mixed in a production and treatment step of the charge generating materials, such as synthesis, pigmentation, or crystallization, and then be used.

From the viewpoint of electrical properties, the particle size of the charge generating material is desirably small. Specifically, the particle size of the charge generating material is preferably 1 μm or less, more preferred 0.5 μm or less. The lower limit is 0.01 μm. Here, the particle size of the charge generating material means the particle size in the state contained in the photosensitive layer.

The amount of the charge generating material in the monolayer-type photosensitive layer is, from the viewpoint of sensitivity, preferably 0.1% by mass or more, and more preferably 0.5% by mass or more. In addition, from the viewpoint of sensitivity and electrification property, the amount is preferably 50% by mass or less, and more preferably 20% by mass or less.

(Charge Transporting Material)

Charge transporting materials are classified into hole transporting materials which mainly have a hole transporting capability and electron transporting materials which mainly have an electron transporting capability. The monolayer-type photosensitive layer used in the present embodiment contains at least a hole transporting material and an electron transporting material.

[Hole Transporting Material]

The hole transporting material (HTM) can be selected and used from known materials. Examples thereof can include electron donating materials, for example, heterocyclic compounds, such as a carbazole derivative, an indole derivative, an imidazole derivative, an oxazole derivative, a pyrazole derivative, a thiadiazol derivative, and a benzofuran derivative, an aniline derivative, a hydrazone derivative, an arylamine derivative, a stilbene derivative, a butadiene derivative, and an enamine derivative, and a compound obtained by bonding two or more of these compounds, and a polymer having a group formed from these compounds in a main chain or a side chain.

Among them, a carbazole derivative, an arylamine derivative, a stilbene derivative, a butadiene derivative, and an enamine derivative, and a compound obtained by bonding two or more of these compounds are preferred, and an arylamine derivative and an enamine derivative are more preferred.

The molecular weight of the hole transporting material is, from the viewpoint of electrical properties, preferably 600 or more, more preferably 650 or more, further preferably 700 or more, and particularly preferably 750 or more. Meanwhile, from the viewpoint of easiness of synthesis and stability of the compound, the molecular weight is preferably 1200 or less, more preferably 1000 or less, and further preferably 900 or less.

One of the hole transporting materials may be used alone or two or more thereof may be used at any ratio and in any combination.

Preferred examples of the structure of the hole transporting material are shown below.

HTM2

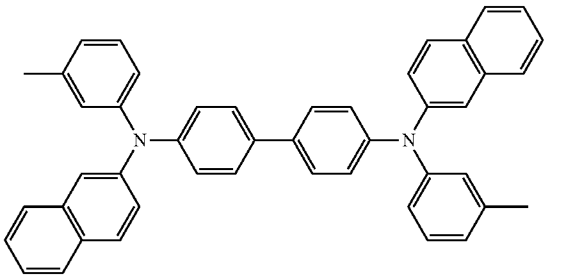

HTM12

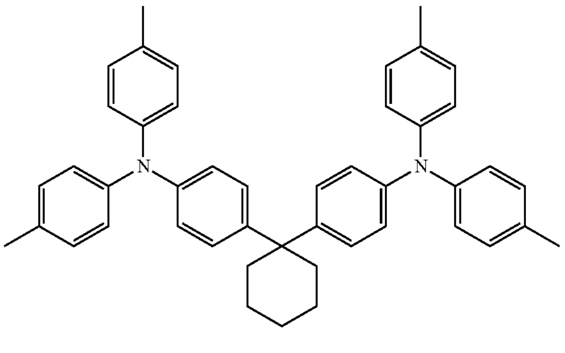

-continued
HTM30
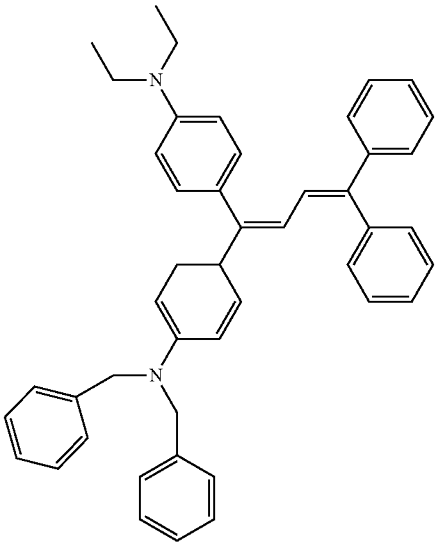
HTM31
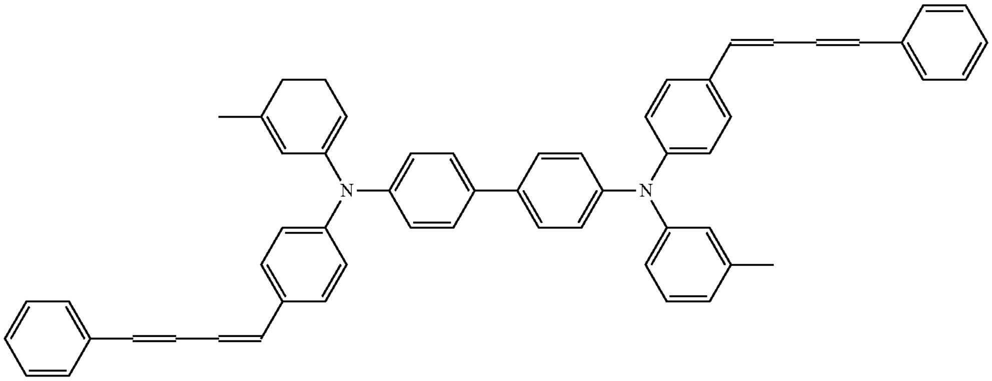
HTM32
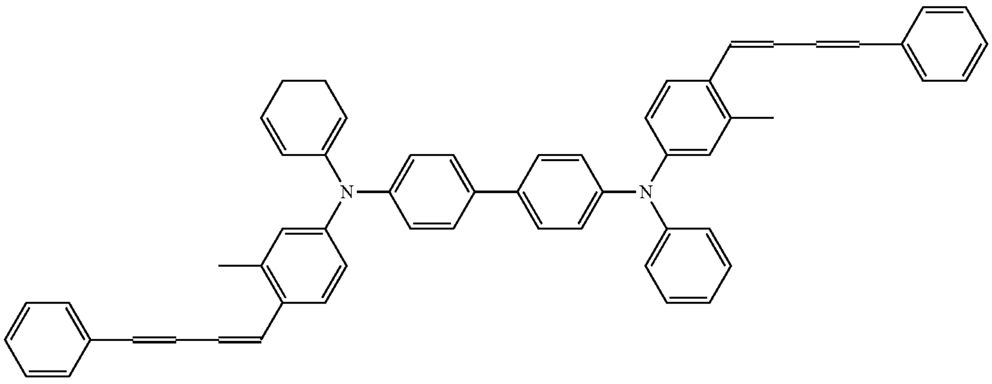

-continued
HTM33
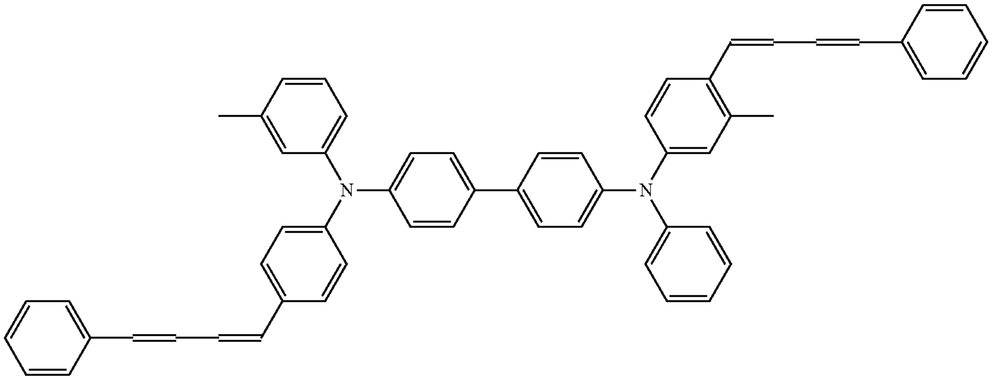
HTM34
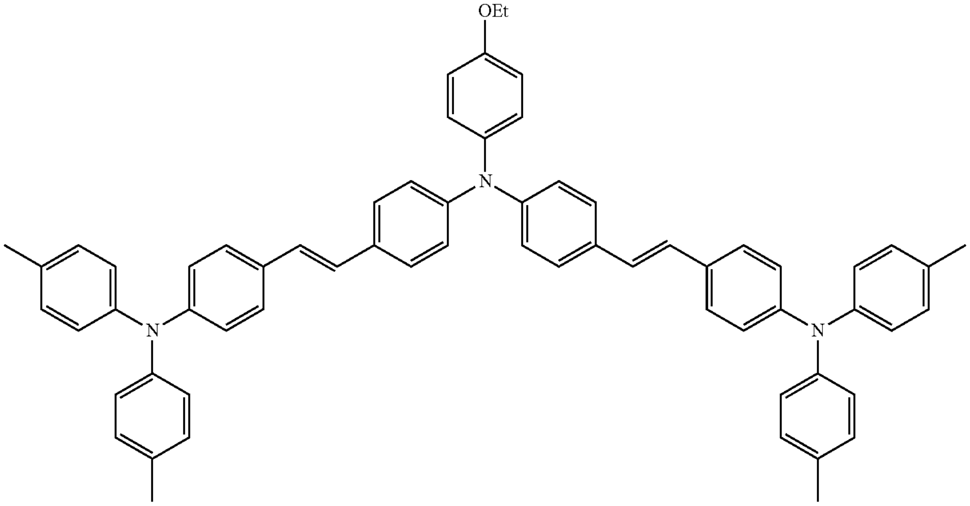
HTM35
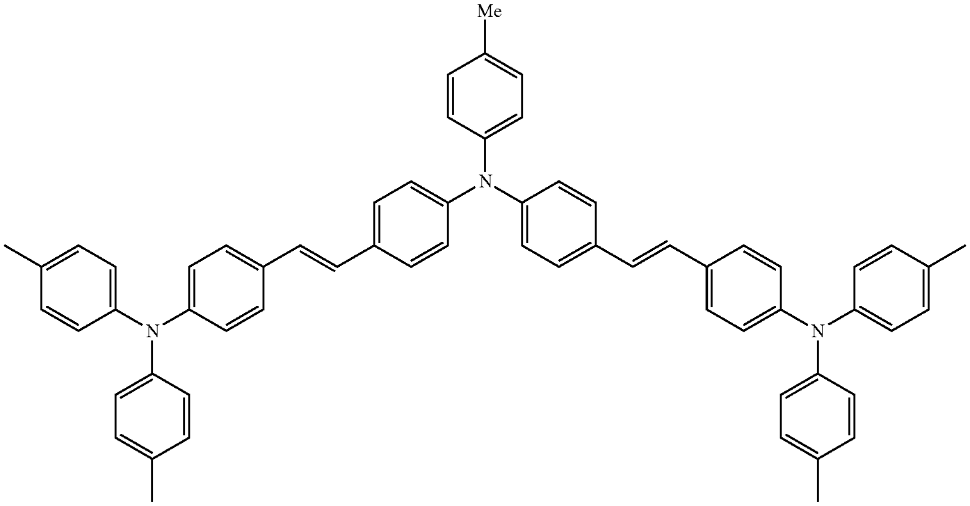

-continued
HTM36
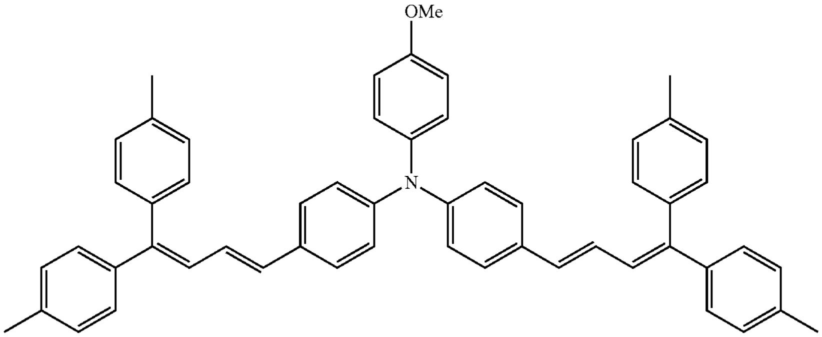
HTM38
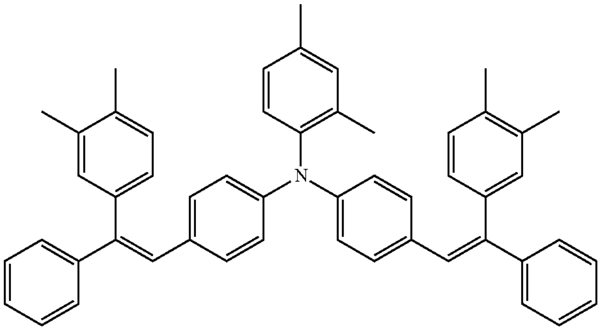
HTM39
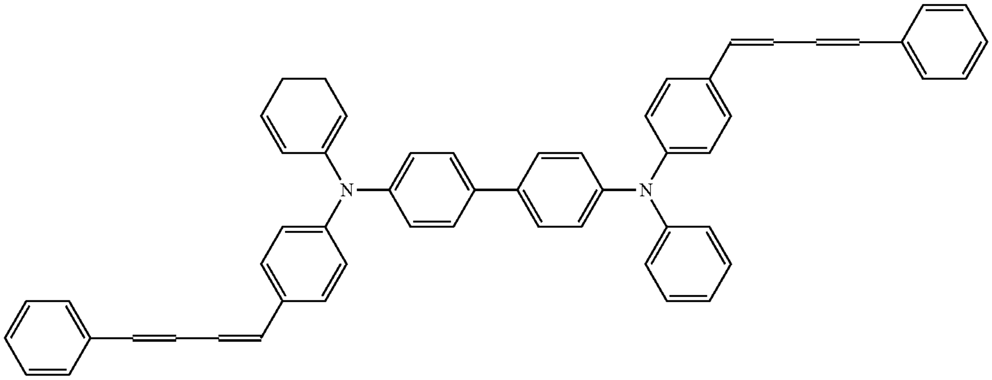
HTM40
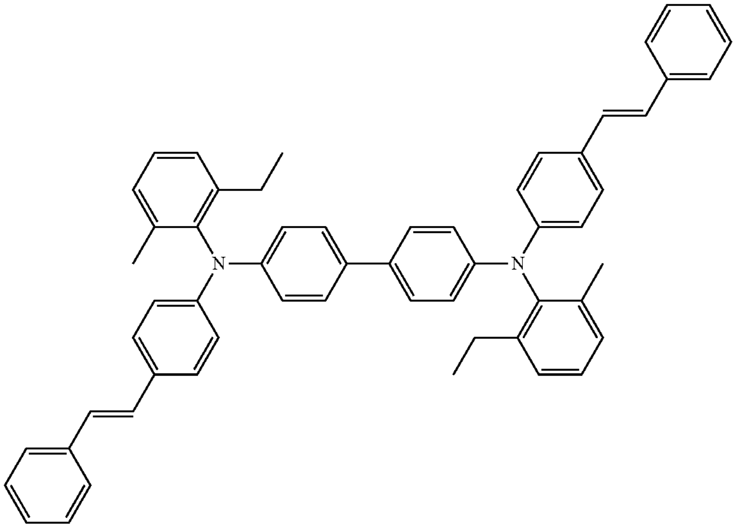

-continued
HTM41
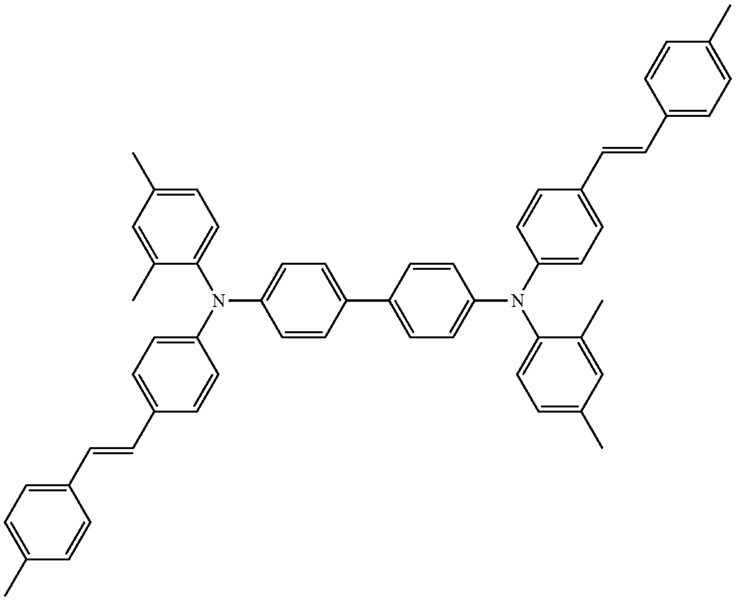
HTM42
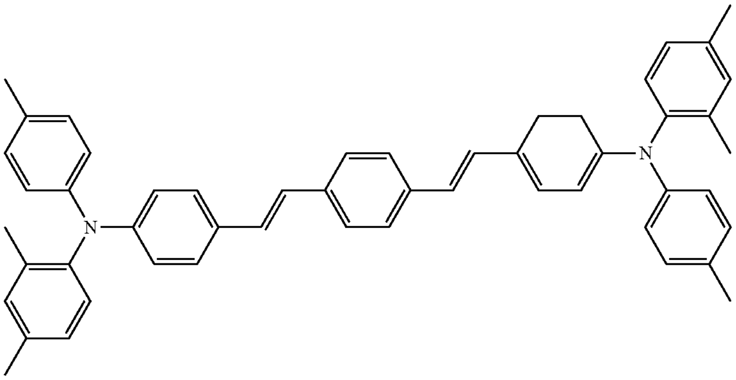
HTM43
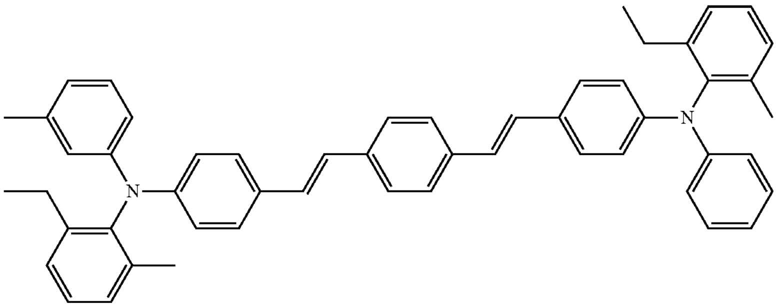
HTM44
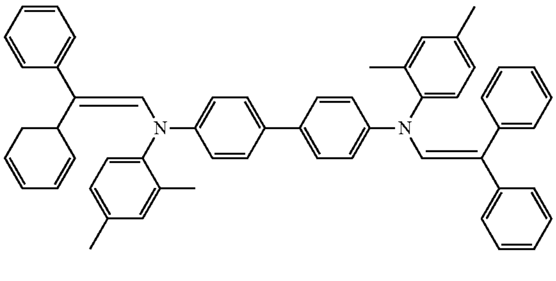
HTM46
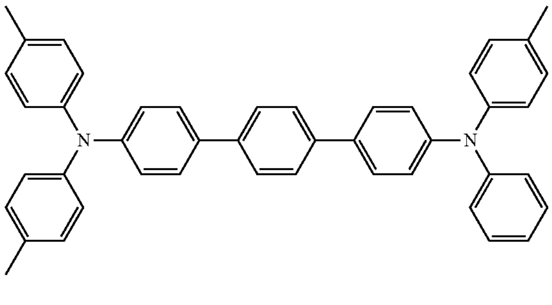

-continued

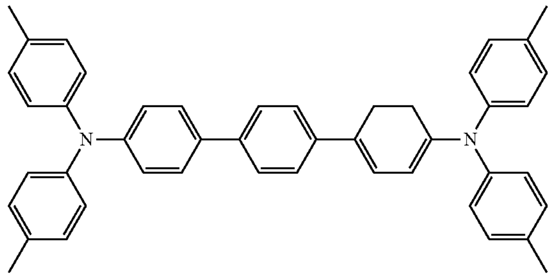

HTM47

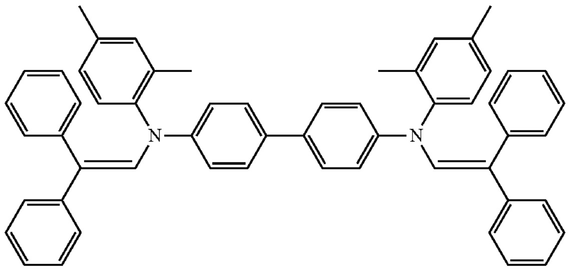

Among the above hole transporting materials, from the viewpoint of electrical properties, HTM31, HTM32, HTM33, HTM34, HTM35, HTM39, HTM40, HTM41, HTM42, HTM43, and HTM48 are preferred, and HTM39, HTM40, HTM41, HTM42, HTM43, and HTM48 are further preferred.

[Electron Transporting Material]

The electron transporting material (ETM) can be selected and used from known materials. Examples thereof can include electron withdrawing materials, for example, an aromatic nitro compound, such as 2,4,7-trinitrofluorenone, a cyano compound, such as tetracyanoquinodimethane, and a quinone compound, such as diphenoquinone, and a known cyclic ketone compound and perylene pigment (perylene derivative). Among them, from the viewpoint of electrical properties, a quinone compound and a perylene pigment (perylene derivative) are preferred, and a quinone compound is more preferred.

Among the quinone compounds, from the viewpoint of electrical properties, diphenoquinone or dinaphthylquinone are preferred. Among them, dinaphthylquinone is more preferred.

The molecular weight of the electron transporting material is, from the viewpoint of electrical properties, preferably 400 or more, more preferably 410 or more, and further preferably 420 or more. Meanwhile, the molecular weight is preferably 1000 or less, more preferably 800 or less, and further preferably 600 or less.

One of the electron transporting materials may be used alone or two or more thereof may be used at any ratio and in any combination.

Preferred examples of the structure of the electron transporting material are shown below.

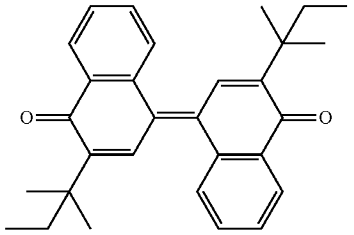

ET-2

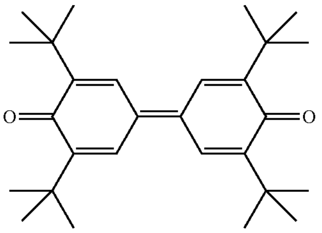

ET-5

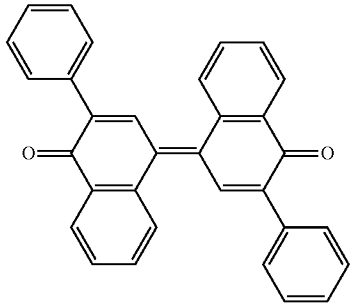

ET-9

Among the above electron transporting materials, in terms of electrical properties, ET-2 and ET-5 are preferred, and ET-2 is further preferred.

[Contents of Hole Transporting Material and Electron Transporting Material]

The ratio of the mass of the electron transporting material contained in the monolayer-type photosensitive layer to the mass of the hole transporting material contained therein is preferably 0.3 or more, and above all, from the viewpoint of electrical properties, is more preferably 0.4 or more. Meanwhile, the ratio is preferably 1.0 or less, and above all, from the viewpoint of suppressing precipitation of the electron transporting material, is more preferably 0.9 or less, and above all, from the viewpoint of adhesiveness, is more preferably 0.8 or less.

When the amount of the hole transporting material in the monolayer-type photosensitive layer is increased, the charge transfer property of this photoreceptor can be enhanced, whereas, as described above, in this protective layer surface, charges are easily transferred in the surface direction (also referred to as horizontal direction) so that image deletion is likely to occur. In addition, when the content of the hole transporting material is increased, the hole transporting material tends to be concentrated in the photosensitive layer surface. Thus, when the content of the hole transporting material in this photosensitive layer is increased, it is preferred to also increase the content of the particles having a band gap of 8.0 eV or more in this protective layer.

From this point of view, the ratio of the mass of the particles having a band gap of 8.0 eV or more contained in this protective layer relative to 100 of the mass of the hole transporting material contained in this photosensitive layer is preferably 5 to 70, above all, more preferably 10 or more or 50 or less, above all, more preferably 15 or more or 40 or less, and above all, further preferably 20 or more or 30 or less.

In addition, from the same point of view, the content of the hole transporting material in this photoreceptor is, relative to 100 parts by mass of a binder resin which will be subsequently described, preferably 70 parts by mass or more, above all, more preferably 80 parts by mass or more, and above all, further preferably 90 parts by mass or more. Meanwhile, the upper limit is more preferably 200 parts by mass or less, and above all, further preferably 150 parts by mass or less.

(Binder Resin)

Next, the binder resin used in this photosensitive layer will be described.

Examples of the binder resin used in this photosensitive layer can include vinyl polymers, such as polymethyl methacrylate, polystyrene, and polyvinyl chloride, or copolymers thereof; a vinyl alcohol resin; a polyvinyl butyral resin; a polyvinyl formal resin; a partially modified polyvinyl acetal resin; a polyarylate resin; a polyamide resin; a polyurethane resin; a polycarbonate resin; a polyester resin; a polyester carbonate resin; a polyimide resin; a phenoxy resin; an epoxy resin; a silicone resin; and a partially-crosslinked cured product thereof. The above resin may be modified with a silicon reagent or the like. One of the resins may be used alone or two or more thereof may be used at any ratio and in any combination.

In addition, the binder resin used in this photosensitive layer preferably contains one polymer or two or more polymers obtained by interface polymerization.

As the binder resin obtained by interface polymerization, a polycarbonate resin and a polyester resin are preferred, and in particular, a polycarbonate resin or a polyarylate resin is preferred. In addition, a polymer obtained by using an aromatic diol as a raw material is particularly preferred, and as a preferred aromatic diol compound, a compound represented by the following formula (11) can be exemplified.

Formula (11)

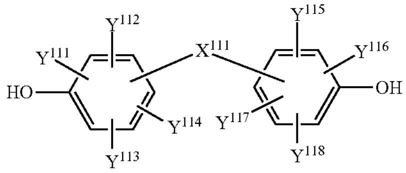

In the formula (11), $X^{111}$ represents a linking group represented by any one of the following formulae or a single bond.

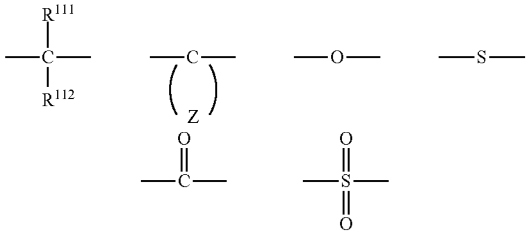

In the above formulae, $R^{111}$ and $R^{112}$ each independently represent a hydrogen atom, an alkyl group having 1 to 20 carbon atoms, an aryl group which is optionally substituted, or a halogenated alkyl group. Z represents a substituted or unsubstituted carbon ring having 4 to 20 carbon atoms.

In the formula (11), $Y^{111}$ or $Y^{118}$ each independently represent a hydrogen atom, a halogen atom, an alkyl group having 1 to 20 carbon atoms, an aryl group which is optionally substituted, or a halogenated alkyl group.

(Other Materials)

Besides the materials described above, this photosensitive layer may contain well-known additives, such as an antioxidant, a plasticizer, an ultraviolet absorber, an electron withdrawing compound, a leveling agent, and a visible light shielding agent, for enhancing film forming ability, flexibility, applicability, contamination resistance, gas resistance, light resistance, and the like. In addition, this photosensitive layer may also contain various additives, such as a sensitizer, a dye, a pigment (excluding those that are the aforementioned charge generating material, hole transporting material, or electron transporting material), and a surfactant, as needed. Examples of the surfactant can include a silicone oil and a fluoro-compound. In the present embodiment, one of them can appropriately be used alone or two or more thereof can be used at any ratio and in any combination.

In addition, for the purpose of reducing friction resistance of the photosensitive layer surface, the photosensitive layer may contain a fluororesin, a silicone resin, or the like, and may contain particles of such a resin or particles of an inorganic compound, such as aluminum oxide.

[Antioxidant]

Antioxidant is one of stabilizers and is used for preventing oxidation of this electrophotographic photoreceptor.

The antioxidant may be any as long as it has an ability as a radical scavenger, and specific examples thereof can include a phenol derivative and an amine compound, vitamin.

Among them, a phenol derivative and an amine compound are preferred. In addition, a hindered phenol which has a bulky substituent around a hydroxy group, a trialkylamine derivative, and the like are more preferred.

In addition, when the molecular weight of the antioxidant is too high, the oxide prevention ability sometimes reduces, and thus, from this point of view, the molecular weight is preferably 1500 or less, and above all, the molecular weight is further preferably 1000 or less. The lower limit is preferably 100 or more, above all, further preferably 150 or more, and above all, further preferably 200 or more.

The amount of the antioxidant used is not particularly limited, but is preferably 0.1 parts by mass or more relative to 100 parts by mass of the binder resin in the photosensitive layer, and above all, further preferably 1 part by mass or more. For achieving good electrical properties and printing durability, the amount is preferably 25 parts by mass or less, and above all, further preferably 20 parts by mass or less.

[Electron Withdrawing Compound]

In addition, this photosensitive layer may contain an electron withdrawing compound.

Specific examples of the electron withdrawing compound include a sulfonate ester compound and an organic cyano compound, and a sulfonate ester compound is preferred. One of the electron withdrawing compounds may be used alone or two or more thereof may be used at any ratio and in any combination.

The amount of the electron withdrawing compound used in this electrophotographic photoreceptor is not particularly limited. When the electron withdrawing compound is used in the photosensitive layer, the amount is preferably 0.01 parts by mass or more relative to 100 parts by mass of the binder resin contained in the photosensitive layer, and more preferably 0.05 parts by mass or more. For good electrical properties, the amount is generally preferably 50 parts by mass or less, more preferably 40 parts by mass or less, and further preferably 30 parts by mass or less.

(Layer Thickness)

When this photosensitive layer is a monolayer-type photosensitive layer, the thickness of this photosensitive layer is, from the viewpoint of dielectric breakdown resistance, preferably 25 μm or more, and above all, further preferably 30 μm or more. Meanwhile, from the viewpoint of electrical properties, the thickness is preferably 50 μm or less, and above all, further preferably 40 μm or less.

<Laminate-Type Photosensitive Layer>

When this electrophotographic photoreceptor is a laminate-type photosensitive layer, for example, a configuration obtained by laminating a charge transporting layer (CTL) containing an electron transporting material (ETM) and a hole transporting material (HTM) on a charge generating layer (CGL) containing a charge generating material (CGM) can be exemplified. In this case, any layer other than the charge generating layer (CGL) and the charge transporting layer (CTL) can also be provided.

<Charge Generating Layer (CGL)>

The charge generating layer generally contains a charge generating material (CGM) and a binder resin.

The charge generating material (CGM) and the binder resin are the same as described above for the monolayer-type photosensitive layer.

(Other Components)

The charge generating layer can contain other components as needed besides the charge generating material and the binder resin. For example, for the purpose of enhancing film forming ability, flexibility, applicability, contamination resistance, gas resistance, light resistance, and the like, known additives, such as an antioxidant, a plasticizer, an ultraviolet absorber, an electron withdrawing compound, a leveling agent, a visible light shielding agent, and a filler, may be incorporated.

(Blending Ratio)

In the charge generating layer, when the proportion of the charge generating material is too high, the stability of the application liquid is possible to reduce due to aggregation and the like of the charge generating material, whereas when the proportion of the charge generating material is too low, the sensitivity as the photoreceptor is possible to reduce. Thus, regarding the ratio of the binder resin and the charge generating material blended (by mass), the charge generating material is preferably contained in a proportion of 10 parts by mass or more relative to 100 parts by mass of the binder resin, above all, more preferably contained in a proportion of 30 parts by mass or more, meanwhile, is preferably contained in a proportion of 1000 parts by mass or less, and above all, further preferably contained in a proportion of 500 parts by mass or less, and from the viewpoint of film strength, more preferably contained in a proportion of 300 parts by mass or less, and further preferably contained in a proportion of 200 parts by mass or less.

(Layer Thickness)

The thickness of the charge generating layer is preferably 0.1 μm or more, and above all, further preferably 0.15 μm or more. Meanwhile, the thickness is preferably 10 μm or less, and above all, further preferably 0.6 μm or less.

<Charge Transporting Layer (CTL)>

The charge transporting layer (CTL) generally contains an electron transporting material (ETM) and a hole transporting material (HTM), and a binder resin.

The electron transporting material (ETM), the hole transporting material (HTM), and the binder resin are the same as those described above for the monolayer-type photosensitive layer.

In the charge transporting layer (CTL), regarding the ratio of the binder resin and the hole transporting material (HTM) blended, the hole transporting material (HTM) is preferably blended in a proportion of 20 parts by mass or more relative to 100 parts by mass of the binder resin, and above all, from the viewpoint of reducing residual potential, is more preferably blended in a proportion of 30 parts by mass or more, and furthermore, from the viewpoint of stability in repeated use and degree of charge transfer, is further preferably blended in a proportion of 40 parts by mass or more. Meanwhile, from the viewpoint of thermal stability of the photosensitive layer, the hole transporting material (HTM) is preferably blended in a proportion of 200 parts by mass or less relative to 100 parts by mass of the binder resin, and furthermore, from the viewpoint of compatibility of the hole transporting material (HTM) and the binder resin, is more preferably blended in a proportion of 150 parts by mass or less, and from the viewpoint of glass transition temperature, is particularly preferably blended in a proportion of 120 parts by mass or less.

(Other Components)

The charge transporting layer can contain, besides the electron transporting material (ETM), the hole transporting material (HTM), and the binder resin, other components as needed. For example, for the purpose of enhancing film forming ability, flexibility, applicability, contamination resistance, gas resistance, light resistance, and the like, known additives, such as an antioxidant, a plasticizer, an ultraviolet absorber, an electron withdrawing compound, a leveling agent, a visible light shielding agent, and a filler, may be incorporated.

(Layer Thickness)

The layer thickness of the charge transporting layer is not particularly limited. From the viewpoint of electrical properties and the viewpoint of image stability, and further from the viewpoint of high resolution, the layer thickness is preferably 5 μm or more and 50 μm or less, above all, more preferably 10 μm or more or 35 μm or less, and above all, further preferably 15 μm or more or 25 μm or less.

<Method for Forming Photosensitive Layer>

In either of the laminate-type or the monolayer-type, the layers can be formed as follows.

Materials to be incorporated are dissolved or dispersed in a solvent to obtain an application liquid, and the application liquid is applied on a conductive support by a known method, such as immersion application, spray application, nozzle application, bar coating, roll coating, or blade application, and the application and a drying step for each layer is sequentially repeated, whereby the layers can be formed.

However, the method for forming layers is not to be limited to the formation method.

The solvent or dispersion medium to be used for production of the application liquid is not particularly limited. Specific examples thereof can include alcohols, such as methanol, ethanol, propanol, and 2-methoxyethanol, ethers, such as tetrahydrofuran, 1,4-dioxane, and dimethoxyethane, aromatic hydrocarbons, such as benzene, toluene, and xylene, and chlorinated hydrocarbons, such as dichloromethane, chloroform, 1,2-dichloroethane, 1,1,2-trichloroethane, 1,1,1-trichloroethane, tetrachloroethane, 1,2-dichloropropane, and trichloroethylene. One of them may be used alone or two or more thereof may be used in any combination and in any types.

The amount of the solvent or dispersion medium used is not particularly limited. In view of the use purpose of each layer and properties of the solvent or dispersion medium selected, the amount is preferably appropriately adjusted so that properties, such as the solid content concentration and the viscosity, of the application liquid are within desired ranges.

Drying of the application film is preferably performed in a manner that drying to touch is performed at room temperature, and then drying under heat generally at a temperature range of 30° C. or higher and 200° C. or lower is performed for 1 minute to 2 hours at a stationary state or under air flow. In addition, the heating temperature may be constant, or the temperature may be varied during the heat drying.

<This Conductive Support>

The conductive support in this electrophotographic photoreceptor (also referred to as "this conductive support") is not particularly limited as long as it supports layers formed thereabove and it has an electrical conductivity.

As this conductive support, for example, a metal material, such as aluminum, an aluminum alloy, stainless steel, copper, or nickel, a resin material with a conductive powder, such as a metal, carbon, or tin oxide, mixed therewith to impart a conductivity, or a resin, glass, paper, or the like with a conductive material, such as aluminum, nickel, or ITO (indium oxide tin oxide alloy), vapor-deposited or applied on the surface thereof is mainly used.

As the form of the conductive support, a drum form, a cylinder form, a sheet form, a belt form, or the like is used.

This conductive support may be a conductive support of a metal material with a conductive material having an appropriate resistance applied thereon for controlling the conductivity, surface properties, and the like, and for covering defects.

When a metal material, such as an aluminum alloy, is used as this conductive support, an anodized film may be provided on the metal material before use.

The average film thickness of the anodized film is preferably 20 μm or less, and in particular, further preferably 7 μm or less.

When an anodized film is applied on a metal material, a sealing treatment is preferably performed. The sealing treatment can be performed by a known method.

The surface of this conductive support may be smooth, or may be roughened by using a special cutting method or by applying a polishing treatment. In addition, the surface may be roughened by mixing particles having an appropriate particle size into materials constituting the support.

Note that an undercoat layer described later may be provided between this conductive support and the photosensitive layer for improving adhesiveness, blocking tendency, and the like.

<This Undercoat Layer>

This electrophotographic photoreceptor may include an undercoat layer (also referred to as "this undercoat layer") between this photosensitive layer and this conductive support.

As this undercoat layer, for example, a resin or a resin with particles of an organic pigment, a metal oxide, or the like dispersed therein is used. Examples of the organic pigment used in the undercoat layer can include a phthalocyanine pigment, an azo pigment, and a perylene pigment. Above all, phthalocyanine pigments and azo pigments, specifically, the phthalocyanine pigments and azo pigments as used as the charge generating material described above can be exemplified.

Examples of the metal oxide particles used in this undercoat layer can include particles of a metal oxide containing one metal element, such as titanium oxide, aluminum oxide, silicon oxide, zirconium oxide, zinc oxide, or iron oxide, and particles of a metal oxide containing two or more metal elements, such as calcium titanate, strontium titanate, or barium titanate. In the undercoat layer, only one kind of the particles may be used or two or more kinds of the particles may be used in mixture at any ratio and in any combination.

Among the above metal oxide particles, titanium oxide and aluminum oxide are preferred, and titanium oxide is particularly preferred. The titanium oxide particles, for example, may be surface-treated with any inorganic material or organic material. In addition, as the crystal form of the titanium oxide particles, any of rutile, anatase, brookite, and amorphous can be used. Two or more crystal states may be contained.

The particle size of the metal oxide particles used in this undercoat layer is not particularly limited. In terms of properties of the undercoat layer and stability of a solution for forming the undercoat layer, the average primary particle size is preferably 10 nm or more, and 100 nm or less, more preferably 50 nm or less.

The binder resin used in this undercoat layer can be selected and used, for example, from polyvinyl acetal-based resins, such as a polyvinyl butyral resin, a polyvinyl formal resin, and a partially acetal-modified polyvinyl butyral resin in which a part of butyral is modified with formal, acetal, or the like; insulating resins, such as a polyarylate resin, a polycarbonate resin, a polyester resin, a phenoxy resin, an acrylic resin, a methacrylic resin, a polyamide resin, a polyurethane resin, an epoxy resin, a silicone resin, a polyvinyl alcohol resin, a styrene-alkyd resin, a silicone-alkyd resin, and a phenol-formaldehyde resin; and the like. However, the binder resin is not to be limited to these polymers.

One of these binder resins may be used alone or two or more thereof may be used in mixture, or may be used in the form cured with a curing agent.

Among them, a polyvinyl acetal-based resin, an alcohol-soluble copolymerized polyamide, a modified polyamide, and the like are preferred because of good dispersibility and application ability. Among them, an alcohol-soluble copolymerized polyamide is particularly preferred.

As the mixing ratio of the particles to the binder resin, any ratio can be selected. The ratio is preferably in the range of 10% by mass to 500% by mass in terms of stability and application ability of the dispersion.

The film thickness of this undercoat layer can be arbitrarily selected. From the viewpoint of properties of the electrophotographic photoreceptor and application ability of the dispersion, the film thickness is preferably 0.1 μm or more, and further preferably 20 μm or less. The undercoat layer may contain a known antioxidant or the like.

<Other Layers>

In addition, this electrophotographic photoreceptor may appropriately include, besides this conductive support, this photosensitive layer, this protective layer, and this undercoat layer described above, other layers as needed.

<<This Image Forming Apparatus>>

Using this electrophotographic photoreceptor, an image forming apparatus ("this image forming apparatus") can be configured.

As shown in FIG. 1, this image forming apparatus is configured to be provided with this electrophotographic photoreceptor 1, an electrification apparatus 2, an exposure apparatus 3, and a development apparatus 4, and furthermore, is provided with a transcription apparatus 5, a cleaning apparatus 6, and a fixation apparatus 7 as needed.

This electrophotographic photoreceptor 1 is not particularly limited as long as it is this electrophotographic photoreceptor as described above. FIG. 1 illustrates, as an example, a drum-shaped photoreceptor in which the photosensitive layer as described above is formed on the surface of a cylindrical conductive support. Along the outer periphery of this electrophotographic photoreceptor 1, the electrification apparatus 2, the exposure apparatus 3, the development apparatus 4, the transcription apparatus 5, and the cleaning apparatus 6 are disposed.

Examples of the electrification apparatus 2 can include a non-contact type corona electrification apparatus, such as corotron or scorotron, and a contact type electrification apparatus (direct type electrification apparatus) in which electrification is performed by bringing an electrifying member with an applied voltage into contact with the photoreceptor surface. Examples of the contact electrification apparatus can include an electrifying roller and an electrifying brush. FIG. 1 illustrates, as an example of the electrification apparatus 2, a roller type electrification apparatus (electrifying roller).

The type of the exposure apparatus 3 is not particularly limited as long as it can perform exposure of this electrophotographic photoreceptor 1 to form an electrostatic latent image on a photosurface of this electrophotographic photoreceptor 1.

Alternatively, the exposure may be achieved by a photoreceptor inner exposure system. Any light may be used in the exposure.

Any type of a toner T may be used, and a powder toner or a polymerized toner obtained by using a suspension polymerization method, an emulsion polymerization method, or the like can be used.

The type of the transcription apparatus 5 is not particularly limited, and an apparatus using any system, for example, an electrostatic transcription method, such as corona transcription, roller transcription, or belt transcription, a pressure transcription method, or a cohesion transcription method can be used. The cleaning apparatus 6 is not particularly limited. For example, any cleaning apparatus, such as a brush cleaner, a magnetic brush cleaner, an electrostatic brush cleaner, a magnetic roller cleaner, or a blade cleaner, can be used. When the amount of the toner remaining on the photoreceptor surface is small or little, no cleaning apparatus 6 may be used.

Note that the image forming apparatus may have, besides the above configuration, for example, a configuration capable of performing a static elimination step.

The image forming apparatus may be configured with further modification, for example, may have a configuration capable of performing a step, such as a pre-exposure step or an auxiliary electrifying step, a configuration in which offset printing is performed, or furthermore, a configuration of a full color tandem system using multiple toners.

<<This Electrophotographic Cartridge>>

An integrated-type cartridge (referred to as "this electrophotographic cartridge") can be configured by combining this electrophotographic photoreceptor 1 with one or two or more of the electrification apparatus 2, the exposure apparatus 3, the development apparatus 4, the transcription apparatus 5, the cleaning apparatus 6, and the fixation apparatus 7.

This electrophotographic cartridge may have a configuration capable of being attached to or detached from an electrophotographic apparatus main body, such as a copying machine or a laser beam printer. In this case, for example, when this electrophotographic photoreceptor 1 or other members are degraded, by detaching this electrophotographic photoreceptor cartridge from an image forming apparatus main body and attaching another new electrophotographic photoreceptor cartridge to the image forming apparatus main body, the maintenance management of the image forming apparatus can be easily performed.

<<Description of Terms>>

In the present embodiment, the phrase of "X to Y" (X and Y are each any numeral) encompasses, unless otherwise specified, together with the meaning of "X or more and Y or less", a meaning of "preferably more than X" or "preferably less than Y".

In addition, a phrase of "X or more" (X is any numeral) or "Y or less" (Y is any numeral) encompasses an intention of "preferably more than X" or "preferably less than Y".

EXAMPLES

Embodiments of the present embodiment will be further specifically described below with reference to examples. However, the following examples are shown for explaining the present embodiment in detail and the present embodiment is not to be limited to the following examples without departing from the gist thereof, and can be implemented with any modification. In addition, the term "parts" in the following Examples and Comparative Examples refers to "parts by mass" unless otherwise specified.

(Production of Application Liquid P1 for Forming Undercoat Layer)

20 parts of a D-type titanyl phthalocyanine that showed a clear peak at a diffraction angle 2θ±0.2° of 27.3° in powder X-ray diffraction using CuKα line and 280 parts of 1,2-dimethoxyethane were mixed, and were pulverized with a sand grinding mill for 2 hours to perform a refining dispersion treatment. To the resultant, 400 parts of a 2.5% 1,2-dimethoxyethane solution of polyvinyl butyral (trade name "Denka butyral" #6000C, manufactured by Denka Company Limited) and 170 parts of 1,2-dimethoxyethane were added and mixed to produce an application liquid P1 for forming undercoat layer.

(Production of Application Liquid Q1 for Forming Monolayer-Type Photosensitive Layer)

2.6 parts of a D-type titanyl phthalocyanine that showed a clear peak at a diffraction angle 2θ±0.2° of 27.3° in powder X-ray diffraction using CuKα line, 1.3 parts of a perylene pigment 1 having the following structure, 0.5 parts of a polyvinyl butyral resin, 100 parts of the following hole transporting material (HTM48, molecular weight: 748), 60 parts of the following electron transporting material (ET-2, molecular weight: 424.2), 100 parts of a polycarbonate resin having biphenyl structure, and 0.05 parts of a silicone oil (tradename: KF-96, manufactured by Shin-Etsu Chemical Co., Ltd.) as a leveling agent were mixed with 793.35 parts of a mixed solvent of tetrahydrofuran (hereinafter appropriately abbreviated as THF) and toluene (hereinafter appropriately abbreviated as TL) (THF: 80% by mass, TL: 20% by mass) to produce an application liquid Q1 for forming monolayer-type photosensitive layer having a solid content concentration of 25% by mass.

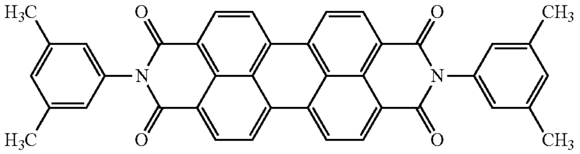

Perylene pigment 1

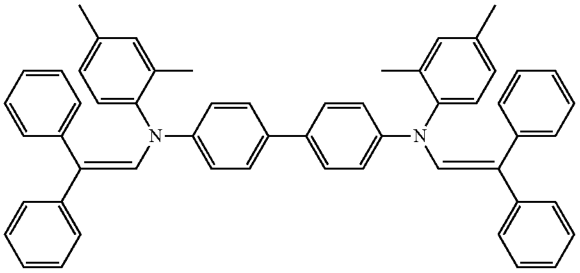

HTM48

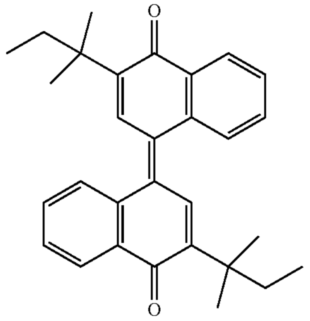

ET-2

(Production of Metal Oxide Particles B)

A rutile-type white titanium oxide (product name: TTO55N, manufactured by ISHIHARA SANGYO KAISHA, LTD.) having an average primary particle size of 35 nm and methyldimethoxysilane in an amount of 3 parts by mass relative to 100 parts by mass of the titanium oxide were agitated by a shear force with a super mixer until the temperature in the mixer reached 150° C. to perform a surface treatment, thereby obtaining metal oxide particles B (band gap: 3.2 eV).

(Production of Metal Oxide Particles B Dispersion Slurry)

1000 g of a raw material slurry obtained by mixing 250 g of the metal oxide particles B and 750 g of methanol was subjected to a dispersion treatment with an ultraapex mill having a mill volume of about 0.15 L (UAM-015 model, manufactured by KOTOBUKI KOGYOU CO., LTD) with zirconia beads having a diameter of about 50 μm (YTZ, manufactured by Nikkato Corporation) as dispersion media in a circulation condition at a rotor peripheral speed of 9 m/second and a liquid flow rate of 2.8 g/second for 30 minutes to produce metal oxide particles B dispersion slurry.

(Production of Metal Oxide Particles C)

Metal oxide particles C (band gap: 3.2 eV) was obtained in the same manner as for the metal oxide particles B except for changing 3 parts by mass of methyldimethoxysilane to 3.5 parts by mass of methyldimethoxysilane.

(Production of Metal Oxide Particles C Dispersion Slurry)

Metal oxide particles C dispersion slurry was produced in the same manner as for the metal oxide particles B dispersion slurry except for chancing the metal oxide particles B to the metal oxide particles C.

(Production of Metal Oxide Particles D)

Tin oxide having an average primary particle size of 21 nm (production name: $SnO_2$, manufactured by CIK NanoTek Corporation) and 3-methacryloyloxytrimethoxysilane in an amount of 5 parts by mass relative to 100 parts by mass of the tin oxide were agitated by a shear force with a super mixer until the temperature in the mixer reached 150° C. to perform a surface treatment, thereby obtaining metal oxide particles D (band gap: 3.8 eV).

(Production of Metal Oxide Particles D Dispersion Slurry)

1000 g of a raw material slurry obtained by mixing 150 g of the metal oxide particles D and 850 g of methanol was subjected to a dispersion treatment with an ultraapex mill having a mill volume of about 0.15 L (UAM-015 model, manufactured by KOTOBUKI KOGYOU CO., LTD) with zirconia beads having a diameter of about 50 μm (YTZ, manufactured by Nikkato Corporation) as dispersion media in a circulation condition at a rotor peripheral speed of 9 m/second and a liquid flow rate of 2.8 g/second for 30 minutes to produce metal oxide particles D dispersion slurry.

(Production of Application Liquid S1 for Forming Protective Layer)

The metal oxide particles B dispersion slurry, an organosilica sol (silica particle slurry) (tradename: EC-2130Y, manufactured by Nissan Chemical Corporation) (average primary particle size of silica particles: 12 nm, surface treatment agent of silica particles: phenyl group-containing silane coupling agent, hereinafter the silica particles are referred to as "silica particles A". The silica particles A had a band gap of 9.0 eV and a specific gravity of 2.2 g/$cm^3$) (solvent: methyl ethyl ketone, solid content concentration: 30% by mass), trimethylolpropane trimethacrylate (production name: TMPT, manufactured by SHIN-NAKAMURA CHEMICAL CO, LTD.) previously dissolved in a mixed solvent of methanol/1-propanol/toluene, and benzophenone and Omnirad TPO H (2,4,6-trimethylbenzoyl-diphenyl phosphine oxide) as polymerization initiators were mixed to obtain an application liquid S1 for forming protective layer with TMPT/metal oxide particles B/silica particles A/benzophenone/Omnirad TPO H of 100/100/25/1/2.

(Production of Application Liquid S2 for Forming Protective Layer)

The metal oxide particles C dispersion slurry, an organosilica sol (tradename: EC-2130Y, manufactured by Nissan Chemical Corporation), trimethylolpropane trimethacrylate (production name: TMPT, manufactured by SHIN-NAKAMURA CHEMICAL CO, LTD.) previously dissolved in a mixed solvent of methanol/1-propanol/toluene, and benzophenone and Omnirad TPO H (2,4,6-trimethylbenzoyl-diphenyl phosphine oxide) as polymerization initiators were mixed to obtain an application liquid S2 for forming protective layer with TMPT/metal oxide particles C/silica particles A/benzophenone/Omnirad TPO H of 100/150/37.5/1/2.

(Production of Application Liquid S3 for Forming Protective Layer)

The metal oxide particles B dispersion slurry, an organosilica sol (tradename: EC-2130Y, manufactured by Nissan Chemical Corporation), trimethylolpropane trimethacrylate (production name: TMPT, manufactured by SHIN-NAKAMURA CHEMICAL CO, LTD.) previously dissolved in a mixed solvent of methanol/1-propanol/toluene, and benzophenone and Omnirad TPO H (2,4,6-trimethylbenzoyl-diphenyl phosphine oxide) as polymerization initiators were mixed to obtain an application liquid S3 for forming protective layer with TMPT/metal oxide particles B/silica particles A/benzophenone/Omnirad TPO H of 100/100/50/1/2.

(Production of Application Liquid S4 for Forming Protective Layer)

The metal oxide particles C dispersion slurry, trimethylolpropane trimethacrylate (production name: TMPT, manufactured by SHIN-NAKAMURA CHEMICAL CO, LTD.) previously dissolved in a mixed solvent of methanol/1-propanol/toluene, and benzophenone and Omnirad TPO H (2,4,6-trimethylbenzoyl-diphenyl phosphine oxide) as polymerization initiators were mixed to obtain an application liquid S4 for forming protective layer with TMPT/metal oxide particles C/benzophenone/Omnirad TPO H of 100/100/1/2.

(Production of Application Liquid S5 for Forming Protective Layer)

The metal oxide particles B dispersion slurry, trimethylolpropane trimethacrylate (production name: TMPT, manufactured by SHIN-NAKAMURA CHEMICAL CO, LTD.) previously dissolved in a mixed solvent of methanol/1-propanol/toluene, and benzophenone and Omnirad TPO H (2,4,6-trimethylbenzoyl-diphenyl phosphine oxide) as polymerization initiators were mixed to obtain an application liquid S5 for forming protective layer with TMPT/metal oxide particles B/benzophenone/Omnirad TPO H of 100/100/1/2.

(Production of Application Liquid S6 for Forming Protective Layer)

The metal oxide particles B dispersion slurry, trimethylolpropane trimethacrylate (production name: TMPT, manufactured by SHIN-NAKAMURA CHEMICAL CO, LTD.) previously dissolved in a mixed solvent of methanol/1-propanol/toluene, and benzophenone and Omnirad TPO H (2,4,6-trimethylbenzoyl-diphenyl phosphine oxide) as polymerization initiators were mixed to obtain an application liquid S6 for forming protective layer with TMPT/metal oxide particles B/benzophenone/Omnirad TPO H of 100/40/1/2.

(Production of Application Liquid S7 for Forming Protective Layer)

The metal oxide particles B dispersion slurry, a urethane acrylate oligomer (production name: UV6300B, manufactured by Mitsubishi Chemical Corporation) previously dissolved in a mixed solvent of methanol/1-propanol/toluene, and benzophenone and Omnirad TPO H (2,4,6-trimethylbenzoyl-diphenyl phosphine oxide) as polymerization initiators were mixed to obtain an application liquid S7 for forming protective layer with UV6300B/metal oxide particles B/benzophenone/Omnirad TPO H of 100/100/1/2.

(Production of Application Liquid S8 for Forming Protective Layer)

The metal oxide particles D dispersion slurry, an organosilica sol (silica particle slurry) (tradename: EC-2130Y, manufactured by Nissan Chemical Corporation), trimethylolpropane trimethacrylate (production name: TMPT, manufactured by SHIN-NAKAMURA CHEMICAL CO, LTD.) previously dissolved in toluene, and benzophenone and Omnirad TPO H (2,4,6-trimethylbenzoyl-diphenyl phosphine oxide) as polymerization initiators were mixed to obtain an application liquid S8 for forming protective layer with TMPT/metal oxide particles D/silica particles A/benzophenone/Omnirad TPO H of 100/100/25/1/2.

<Production of Monolayer-Type Photoreceptor>

A monolayer-type photoreceptor was produced according to the following procedure.

Example 1

The application liquid P1 for forming undercoat layer was applied by immersion application on an aluminum cylinder of 30 mmo and a length of 244 mm with a surface processed by a cutting process, to form an undercoat layer so as to give a film thickness after drying of 0.3 μm. The application liquid Q1 for forming monolayer-type photosensitive layer was applied by immersion application on the undercoat layer and was dried at 125° C. for 24 minutes to form a monolayer-type photosensitive layer so as to give a film thickness after drying of 32 μm. The application liquid S1 for forming protective layer was applied by ring application on the monolayer-type photosensitive layer, was dried at room temperature for 10 minutes, and then, was irradiated with LED light of 365 nm at an intensity of 1.3 $W/cm^2$ for 2 minutes while rotating the photoreceptor at 60 rpm under nitrogen atmosphere to from a protective layer so as to give a thickness after curing of 2.0 μm, whereby a photoreceptor A1 was produced.

Example 2

A photoreceptor A2 was produced in the same manner as for the photoreceptor A1 except for changing the application liquid S1 for forming protective layer to the application liquid S2 for forming protective layer.

Example 3

A photoreceptor A3 was produced in the same manner as for the photoreceptor A1 except for changing the application liquid S1 for forming protective layer to the application liquid S3 for forming protective layer.

Comparative Example 1

A photoreceptor A4 was produced in the same manner as for the photoreceptor A1 except for changing the application liquid S1 for forming protective layer to the application liquid S4 for forming protective layer.

Comparative Example 2

A photoreceptor A5 was produced in the same manner as for the photoreceptor A1 except for changing the application liquid S1 for forming protective layer to the application liquid S5 for forming protective layer.

Comparative Example 3

A photoreceptor A6 was produced in the same manner as for the photoreceptor A1 except for changing the application liquid S1 for forming protective layer to the application liquid S6 for forming protective layer.

Comparative Example 4

A photoreceptor A7 was produced in the same manner as for the photoreceptor A1 except for changing the application liquid S1 for forming protective layer to the application liquid S7 for forming protective layer.

Comparative Example 5

A photoreceptor A8 was produced in the same manner as for the photoreceptor A1 except for changing the application liquid S1 for forming protective layer to the application liquid S8 for forming protective layer.

<Evaluation of Image Deletion (Initial HH Environment)>

The photoreceptor A1 to A8 were allowed to stand under an environment at a temperature of 32° C. and a relative humidity of 80% (HH environment) for 16 hours, and then, were each attached to a printer of an electrophotographic system, and printing was performed under an environment at a temperature of 32° C. and a relative humidity of 80% (HH environment). Then, the printed image was visually observed under normal temperature and normal humidity.

The image deletion was evaluated by the following four grades. The results are shown in Table 1.

A: Image deletion was not seen.

B: Image deletion was able to be seen but the level was so low to cause no practical problem.

C: Image deletion was seen, which caused a practical problem.

D: Significant image deletion was seen, which caused a practical problem.

<Evaluation of Electrical Property (LL Environment)>

The photoreceptor A1 to A8 were allowed to stand under an environment at a temperature of 10° C. and a relative humidity of 20% (LL environment) for 16 hours, and then, were each attached to an electrophotographic properties evaluation apparatus (described in Zoku Denshishashin Gijutu no Kiso to Oyo (Sequel to foundation and application of electrophotographic technique), edited by The Society of Electrophotography of Japan, CORONA PUBLISHING CO., LTD., pp. 404 to 405) fabricated according to the measurement standard of The Society of Electrophotography of Japan, and an electrical property through a cycle of electrification, exposure, potential measurement, and static elimination was measured as follows.

First, the grid voltage was regulated under an environment at a temperature of 10° C. and a relative humidity of 20% (LL environment) and the photoreceptor was electrified so as to have an initial surface potential (V0) of +850V. Next, the photoreceptor was irradiated with an exposure light of 0.7 $\rho J/cm^2$, and a surface potential (VL) was measured at 30 milliseconds after irradiation. Note that, as the exposure light, monochromic light of 780 nm extracted from halogen lamp light through an interference filter was used.

The surface potential (VL) is shown in Table 1. A lower absolute value of the surface potential (VL) shows a better electrical property. In the present embodiment, a surface potential (VL) of 170 V or lower was evaluated as "acceptable".

TABLE 1

| | Curable compound (parts by mass) | Silica particles (parts by mass) | Metal oxide particles (parts by mass) | Image deletion (Initial HH environment) | Electrical property (LL environment) VL [V] |
|---|---|---|---|---|---|
| Example 1 | TMPT (100) | A (25) | B (100) | A | 143 |
| Example 2 | TMPT (100) | A (37.5) | C (150) | A | 140 |
| Example 3 | TMPT (100) | A (50) | B (100) | A | 166 |
| Comparative Example 1 | TMPT (100) | — | C (100) | C | 126 |
| Comparative Example 2 | TMPT (100) | — | B (100) | D | 117 |
| Comparative Example 3 | TMPT (100) | — | B (40) | A | 205 |
| Comparative Example 4 | UV6300B (100) | — | B (100) | D | 128 |
| Comparative Example 5 | TMPT (100) | A (25) | D (100) | C | 131 |

CONSIDERATION

It has been found from the Examples and the tests heretofore performed by the present inventors that a photoreceptor having formed therein a protective layer that contains a cured product of a curable compound, such as a polyfunctional acrylate or a polyfunctional methacrylate, and at least conductive particles having a band gap of 2.0 eV or more and 3.6 eV or less and particles having a band gap of 8.0 eV or more can suppress occurrence of image deletion at an initial stage of start of printing. Presumably, by incorporating particles having a band gap of 8.0 eV or more together with the conductive particles into this protective layer, reduction in the surface resistivity of the protective layer is suppressed and the particles having a band gap of 8.0 eV or more intervene among the conductive particles in the form of spacer to be able to suppress charge transfer in the horizontal direction, whereby image deletion can be suppressed.

Here, it is considered that, since particles having a band gap of 8.0 eV or more, such as silica particles, have a lower charge conductivity than conductive particles having a band gap of 2.0 eV or more and 3.6 eV or less, such as titanium oxide particles, by using particles having a lower charge conductivity together with the conductive particles, reduction in the surface resistivity of the protective layer is suppressed and flow of charges in the surface direction (also referred to as horizontal direction) of the protective layer surface can be suppressed, whereby the image deletion can be effectively suppressed. Thus, it is considered that any particles that have a band gap of 8.0 eV or more can provide the effect as with the silica particles used in Examples. It is also considered that any conductive particles that have a band gap of 2.0 eV or more and 3.6 eV or less can provide the effect as with the titanium oxide particles used in Examples.

The invention claimed is:

1. An electrophotographic photoreceptor comprising a photosensitive layer and a protective layer in sequence on a conductive support, the protective layer containing: (i) a cured product of a curable compound; (ii) conductive particles having a band gap of 2.0 eV or more and 3.6 eV or less; and (iii) particles having a band gap of 8.0 eV or more, wherein an average primary particle size of the particles having a band gap of 8.0 eV or more is ⅕ or more and ⅔ or less of the average primary particle size of the conductive particles.

2. The electrophotographic photoreceptor according to claim 1, wherein the curable compound comprises a polyfunctional acrylate or a polyfunctional methacrylate.

3. The electrophotographic photoreceptor according to claim 1, wherein the conductive particles comprise metal oxide particles.

4. The electrophotographic photoreceptor according to claim 1, wherein the conductive particles include titanium oxide particles.

5. The electrophotographic photoreceptor according to claim 1, wherein the particles having a band gap of 8.0 eV or more have a specific gravity of 3.0 $g/cm^3$ or less.

6. The electrophotographic photoreceptor according to claim 1, wherein the particles having a band gap of 8.0 eV or more comprise silica particles.

7. The electrophotographic photoreceptor according to claim 1, wherein an amount of the particles having a band gap of 8.0 eV or more is 5 parts by mass or more and 100 parts by mass or less relative to 100 parts by mass of the conductive particles contained in the protective layer.

8. The electrophotographic photoreceptor according to claim 1, wherein the particles having a band gap of 8.0 eV or more are surface-treated with an organic metal compound.

9. The electrophotographic photoreceptor according to claim 8, wherein the organic metal compound comprises a phenyl group-containing silane coupling agent.

10. The electrophotographic photoreceptor according to claim 1, wherein an average primary particle size of the particles having a band gap of 8.0 eV or more is 5 nm or more and 50 nm or less.

11. The electrophotographic photoreceptor according to claim 1, wherein an amount of the particles having a band gap of 8.0 eV or more is 20 parts by mass or more and 120 parts by mass or less relative to 100 parts by mass of the curable compound contained in the protective layer.

12. The electrophotographic photoreceptor according to claim 1, wherein the protective layer further comprises a charge transporting material in an amount of 1 part by mass or less relative to 100 parts by mass of the curable compound.

13. The electrophotographic photoreceptor according to claim 1, wherein the photosensitive layer is a single layer, and contains at least a charge generating material, an electron transporting material, and a hole transporting material, and a binder resin.

14. The electrophotographic photoreceptor according to claim 13, wherein the photosensitive layer contains the hole transporting material in an amount of 70 parts by mass or more relative to 100 parts by mass of the binder resin.

15. An electrophotographic photoreceptor cartridge comprising the electrophotographic photoreceptor according to claim 1.

16. An image forming apparatus comprising the electrophotographic photoreceptor according to claim 1.

17. The electrophotographic photoreceptor according to claim 1, wherein the content of the conductive particles in the protective layer is 5 parts by mass or more and 300 parts by mass or less relative to 100 parts by mass of the curable compound contained in the protective layer.

18. The electrophotographic photoreceptor according to claim 1, wherein the content of the conductive particles in the protective layer is 10 parts by mass or more and 200 parts by mass or less relative to 100 parts by mass of the curable compound contained in the protective layer.

19. The electrophotographic photoreceptor according to claim 1, wherein the content of the conductive particles in the protective layer is 20 parts by mass or more and 150 parts by mass or less relative to 100 parts by mass of the curable compound contained in the protective layer.

* * * * *